(12) United States Patent
Nishikawa

(10) Patent No.: US 12,053,694 B2
(45) Date of Patent: Aug. 6, 2024

(54) NON-TRANSITORY COMPUTER READABLE MEDIUM, METHOD OF CONTROLLING A GAME, AND INFORMATION PROCESSING SYSTEM WITH MODIFICATION OF IDENTIFICATION IMAGES BASED ON CHANGE TO GAME PARAMETER

(71) Applicant: GREE, INC., Tokyo (JP)

(72) Inventor: Tomoaki Nishikawa, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 18/216,247

(22) Filed: Jun. 29, 2023

(65) Prior Publication Data
US 2023/0338838 A1 Oct. 26, 2023

Related U.S. Application Data

(63) Continuation of application No. 17/710,468, filed on Mar. 31, 2022, now Pat. No. 11,745,100, which is a (Continued)

(30) Foreign Application Priority Data

Oct. 5, 2015 (JP) .................. 2015-197843

(51) Int. Cl.
*A63F 13/42* (2014.01)
*A63F 13/25* (2014.01)
(Continued)

(52) U.S. Cl.
CPC .............. *A63F 13/42* (2014.09); *A63F 13/25* (2014.09); *A63F 13/335* (2014.09); *A63F 13/35* (2014.09);
(Continued)

(58) Field of Classification Search
CPC .......... A63F 13/35; A63F 13/25; A63F 13/42; A63F 13/79; A63F 13/533; A63F 13/335; A63F 13/822
See application file for complete search history.

(56) References Cited

U.S. PATENT DOCUMENTS 6,306,033 B1 * 10/2001 Niwa ...................... A63F 13/10
  463/31
6,676,519 B2 * 1/2004 Nakazawa .............. A63F 13/10
  463/31
(Continued)

FOREIGN PATENT DOCUMENTS

JP    H10-21034 A    1/1998
JP    2000-254348 A    9/2000
(Continued)

OTHER PUBLICATIONS

Notice of Reasons for Refusal mailed Feb. 1, 2022 in corresponding Japanese Patent Application No. 2020-208596 (with English translation)(8 pages).
(Continued)

*Primary Examiner* — Steve Rowland
(74) *Attorney, Agent, or Firm* — Oliff PLC

(57) ABSTRACT

A system that stores information related to a first plurality of game contents; receives a first user operation to select a second plurality of game contents from among the first plurality of game contents; controls a display to display a plurality of identification images based on information corresponding to the second plurality of game contents; receives a second user operation to change a first parameter corresponding to the second plurality of game contents; and modifies each of the plurality of identification images in accordance with the change to the first parameter.

16 Claims, 13 Drawing Sheets

Related U.S. Application Data continuation of application No. 17/018,945, filed on Sep. 11, 2020, now Pat. No. 11,325,033, which is a continuation of application No. 16/215,343, filed on Dec. 10, 2018, now Pat. No. 10,799,793, which is a continuation of application No. 15/277,166, filed on Sep. 27, 2016, now Pat. No. 10,188,947.

(51) Int. Cl.
*A63F 13/335* (2014.01)
*A63F 13/35* (2014.01)
*A63F 13/533* (2014.01)
*A63F 13/79* (2014.01)
*A63F 13/822* (2014.01)

(52) U.S. Cl.
CPC ............ *A63F 13/533* (2014.09); *A63F 13/79* (2014.09); *A63F 13/822* (2014.09); *A63F 2300/407* (2013.01)

(56) References Cited

U.S. PATENT DOCUMENTS

| | | | |
|---|---|---|---|
| 7,594,847 B1* | 9/2009 | York | A63F 13/48 463/2 |
| 2002/0045470 A1* | 4/2002 | Atsumi | A63F 13/10 463/9 |
| 2002/0073412 A1 | 6/2002 | Takeoka | |
| 2004/0157662 A1* | 8/2004 | Tsuchiya | A63F 13/5378 463/32 |
| 2006/0287027 A1* | 12/2006 | Hardisty | A63F 13/45 463/8 |
| 2010/0088124 A1* | 4/2010 | Diefendorf | G06Q 40/08 705/4 |
| 2013/0038623 A1 | 2/2013 | Tezuka et al. | |
| 2014/0349770 A1 | 11/2014 | Arizuka et al. | |

FOREIGN PATENT DOCUMENTS

| | | |
|---|---|---|
| JP | 2002078975 A | 3/2002 |
| JP | 2002-169686 A | 6/2002 |
| JP | 2003-344782 A | 12/2003 |
| JP | 2005000304 A | 1/2005 |
| JP | 2007105257 A | 4/2007 |
| JP | 2008302015 A | 12/2008 |
| JP | 2012-447 A | 1/2012 |
| JP | 2012-69122 A | 4/2012 |
| JP | 2013-248370 A | 12/2013 |
| JP | 2014-226440 A | 12/2014 |
| JP | 5678368 B1 | 3/2015 |
| JP | 2015-71075 A | 4/2015 |
| JP | 2015-116469 A | 6/2015 |
| JP | 2015104411 A | 6/2015 |
| JP | 2015-123094 A | 7/2015 |
| WO | 2011/105087 A1 | 9/2011 |

OTHER PUBLICATIONS

About my status, Royal Knights, The Wayback Machine, [online], Aug. 23, 2015, Searched Jan. 6, 2022 https://web.archive.org/web/20150823043054/https://lazo.warau.jp/royalKnights/manual/5/ (with English translation) (7 pages).
Japanese Office Action dated Jun. 21, 2016 issued for the corresponding Japanese Patent Application No. 2016-066539 (with English Translation) 9 pages.
Japanese Office Action dated Nov. 10, 2015 issued for the corresponding Japanese Patent Application No. 2015-197843 (with English Translation) 8 pages.
Office Action issued Dec. 19, 2017 in Japanese Patent Application No. 2016-247678 (with English language translation).
Japanese Office Action dated Jun. 31, 2018 in Japanese Patent Application No. 2016-247678 (with English Translation) 7 pages.
Oba et al/Enterbrain, Inc., Aug. 12, 2011, Enterbrain MookTERA Starting Guide, 1st edition, 2 pgs.
ASCII Media Works, Inc., Oct. 23, 2009, World Soccer Winning Eleven 2010, Dengeki Playstation, vol. 15, No. 37, p. 43, 1 page.
Office Action issued Oct. 29, 2019 in Japanese Patent Application No. 2016-247678, 12 pages (with English translation).
Office Action issued Nov. 12, 2019 in Japanese Patent Application No. 2016-199714, 8 pages (with English translation).
"{SFC) Dragon Ball Z Clear Super Fighting Super Difficulty" Youtube, https://www.youtube.com/watch?v=AfvVIXARuVw, Dec. 26, 2012, 4 pages.
"KOF98 Super Special Moves" Youtube. https://www.youtube.com/watch?v=KGzijDARXMQ, Jan. 3, 2013, 3 pages.
Jun. 20, 2023 Office Action issued in Japanese Patent Application No. 2022-136434.
Octoba, "[Kerihime sweets thorough capture] 10th: Different items are OK! Tips for strengthening equipment Part 2!" <https://octoba.net/archives/20130531-android-feature-karihime10_html> (May 23, 2014).

* cited by examiner

FIG. 2

| Object ID | Shape data | Placing information | Information related to first game contents ||||||||
|---|---|---|---|---|---|---|---|---|---|---|
| | | | First game content ID | game parameters ||||| Intra-object placing information | Placing information |
| | | | | Type | Attribute | Level | Experience Points | HP | ... | | |
| object001 | **** | **** | content001 | **** | **** | **** | **** | **** | ... | **** | **** |
| | | | content002 | **** | **** | **** | **** | **** | ... | **** | **** |
| | | | ... | ... | ... | ... | ... | ... | ... | ... | ... |
| object002 | **** | **** | content011 | **** | **** | **** | **** | **** | ... | **** | **** |
| | | | content012 | **** | **** | **** | **** | **** | ... | **** | **** |
| | | | ... | ... | ... | ... | ... | ... | ... | ... | ... |
| ... | ... | ... | ... | ... | ... | ... | ... | ... | ... | ... | ... |

| Level | Experience points |
|---|---|
| 0 | 0 |
| 1 | 100 |
| 2 | 200 |
| ⋮ | ⋮ |
| n | 100n |
| ⋮ | ⋮ |

# NON-TRANSITORY COMPUTER READABLE MEDIUM, METHOD OF CONTROLLING A GAME, AND INFORMATION PROCESSING SYSTEM WITH MODIFICATION OF IDENTIFICATION IMAGES BASED ON CHANGE TO GAME PARAMETER

CROSS-REFERENCE TO RELATED APPLICATIONS

This application is a continuation of U.S. Ser. No. 17/710,468 filed Mar. 31, 2022, which is a continuation is U.S. Ser. No. 17/018,945 filed Sep. 11, 2020, which is a continuation of U.S. Ser. No. 16/215,343, filed Dec. 10, 2018, which is a continuation of U.S. Pat. No. 10,188,947, issued Jan. 29, 2019, which claims priority to and the benefit of Japanese Patent Application No. 2015-197843, filed Oct. 5, 2015, the entire contents of each of the above applications being incorporated herein by reference.

TECHNICAL FIELD

This disclosure relates to a non-transitory computer readable medium, a method of controlling a game, and an information processing system.

BACKGROUND

In a conventional game, a user performs a predetermined operation to produce a desired effect on, for example, game contents placed in a virtual space within the game, such as facilities or characters. For example, JP 2002-078975 A (PTL 1) describes a game in which a user performs farming operations to cultivate crops on a virtual farm.

CITATION LIST

Patent Literature

PTL 1: JP 2002-078975 A

SUMMARY

However, for example as more game contents are placed in a virtual space, the user is required to perform more operations and the complexity of handling game contents increases, which could increase the burden on the user. Such a game thus has room for improvement in terms of the complexity of user operation to handle game contents.

It would therefore be helpful to provide a non-transitory computer readable medium, a method of controlling a game, and an information processing system that reduce the complexity of user operation to handle game contents.

One or more non-transitory computer readable media including computer program instructions, which when executed by an information processing system, cause the information processing system to:
 store, in memory, information related to a first plurality of game contents;
 receive, via a user interface, a first user operation to select a second plurality of game contents from among the first plurality of game contents;
 control a display to display a plurality of identification images based on information corresponding to the second plurality of game contents;
 receive, via the user interface, a second user operation to change a first parameter corresponding to the second plurality of game contents; and
 modify each of the plurality of identification images in accordance with the change to the first parameter.

A method executed by an information processing system, the method comprising:
 receiving a first user operation corresponding to a selection of a first plurality of game contents from among a plurality of game contents stored in memory;
 controlling a display to display a plurality of identification images based on information corresponding to the selected first plurality of game contents;
 receiving a second user operation corresponding to a change of a first parameter corresponding to the first plurality of game contents; and
 modifying each of the plurality of identification images in accordance with the change to the first parameter.

An information processing system comprising:
 memory configured to store information related to a first plurality of game contents; and
 circuitry configured to
  receive a first user operation selecting a second plurality of game contents from among the first plurality of game contents stored in the memory;
  control a display to display a plurality of identification images based on information corresponding to the second plurality of game contents;
  receive a second user operation to change a first parameter corresponding to the second plurality of game contents; and
  modify each of the plurality of identification images in accordance with the change to the first parameter.

The non-transitory computer readable medium, method of controlling a game, and information processing system of this disclosure can reduce the complexity of user operation to handle game contents.

BRIEF DESCRIPTION OF THE DRAWINGS

In the accompanying drawings:
FIG. 2 illustrates information, related to objects, stored by the server memory in FIG. 1.

DETAILED DESCRIPTION

Figure 1:
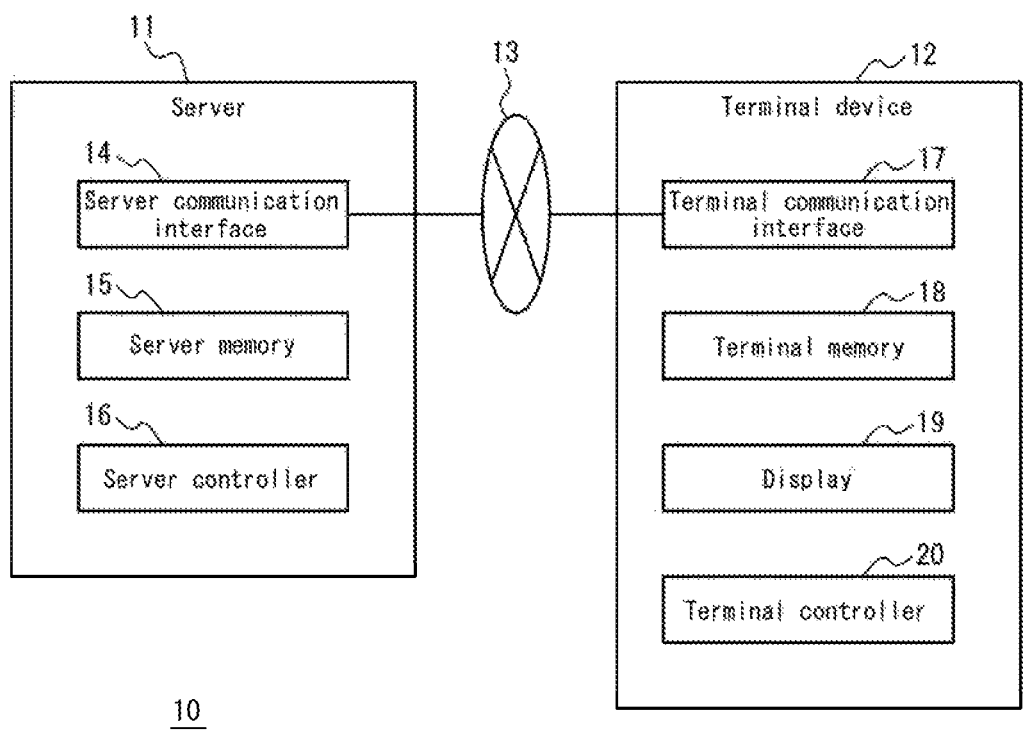
FIG. 1 is a block diagram of a game system according to one of the embodiments.

The following describes embodiments of this disclosure.
First, with reference to FIG. 1, a game system 10 according to one of the embodiments is described. The game system 10 includes a server 11 and a plurality of terminal devices 12. While only one terminal device 12 is illustrated in FIG. 1 for the sake of simplicity, the present disclosure encompasses configurations including one or more terminal devices 12. The server 11 and the terminal devices 12 are, for example, connected for communication over a network 13 such as the Internet. The server 11 provides a game to the terminal devices 12 owned by individual users. The terminal devices 12 execute a game provided by the server 11.

An outline of the game according to this embodiment is now provided. The game according to this embodiment is a game that conducts battles using game contents. The game contents are electronic data used in the game and may be any sort of contents, including cards, items, characters, avatars, and the like. The game contents are electronic data that may be acquired, held, used, managed, traded, combined, strengthened, sold, discarded, and/or transferred by users in the game, but the forms of use of the game contents are not limited to the forms specified in this disclosure.

Except when noted otherwise, hereinafter "game contents possessed by the user" refer to game contents associated with a user's user ID. "Granting a game content to a user" refers to associating the game content with a user ID. "Discarding a game content possessed by a user" refers to dissolving the association between a user ID and a game content. "Consuming a game content possessed by a user" refers to how some sort of result or effect may be generated in response to dissolution of the association between a user ID and a game content. "Selling a game content possessed by a user" refers to dissolving the association between a user ID and a game content and associating a different game content (for example, virtual currency, an item, or the like) with the user ID. "Transferring a game content possessed by user A to user B" refers to dissolving the association between the user ID of user A and a game content and associating the game content with the user ID of user B.

In broad terms, the game according to this embodiment includes a first game stage, a second game stage, and a third game stage, yet may also include another game stage.

In the first game stage, the user's terminal device 12 places a virtual object in a virtual space. "Placing an object in a virtual space" includes, for example, associating predetermined information related to placement of an object, such as positioning information indicating the position in a virtual space or direction information indicating the direction, with the object. Two or more game contents (first game content), such as an artillery battery, land mine, factory, stope, character, and the like are associated with the object. Each first game content is fixedly placed on the corresponding object. Accordingly, the placement of each first game content in a virtual space is uniquely identified by the placement of the corresponding object in the virtual space. Hence, the first game stage is a game stage in which first game contents are placed in a virtual space by object.

In the second game stage, the user's terminal device 12 conducts a battle between a game content operated by the user (second game content) and a first game content possessed by another user in a virtual space in which the first and second game contents are placed. Specifically, the user's terminal device 12 receives, via the server 11, information related to the other user's first game content placed in the virtual space in the first game stage executed on the other user's terminal device 12. Next, the user's terminal device 12 places the other user's first game content and the user's second game content in the virtual space. Then, in response to the user operation, the user's terminal device 12 operates the second game content to battle the first game content. In the second game stage, the user operates the second game content and attempts to capture the virtual space (to complete a game task). For example, upon satisfaction of a predetermined condition, such as the second game content moving to a predetermined position or winning a battle against a predetermined first game content in the virtual space, it is determined that the game task has been successfully completed. In accordance with the results of the second game stage (for example, whether or not the game task has been completed), a predetermined reward (for example, a game content such as virtual currency or an item, predetermined points, or the like) is granted to the user.

In the third game stage, the user's terminal device 12 changes game parameters such as the level, experience points, Hit Points (HP) of the first game content, and the like by consuming a predetermined game content or predetermined points.

For example, the user's terminal device 12 consumes a predetermined game content or predetermined points, such as virtual currency, an item, or the like, and changes the experience points of the first game content. When the experience points exceed a predetermined reference value, the level of the first game content increases and the first game content gains increased strength in the second game stage. Such predetermined game content or points may be granted as a reward to the user in the second game stage, as described above, and can be granted in another game stage as well.

Alternatively, the user's terminal device 12 may repair the user's own first game contents (for example, increases HP that decrease for example due to an attack by another user's second game content) that were harmed (for example, damaged) by a battle with a second game content operated by another user as a result of the second game stage executed on the other user's terminal device 12. For example, as a result of an attack by the second game content, a game parameter (for example, HP) of the first game content reduces. The user's terminal device 12 for example consumes a predetermined game content or predetermined points associated with the user and increases the reduced HP of the first game content to approach a target value (for example, the maximum value).

The amount of change in the game parameter of the first game content may differ in accordance with the type and number (amount) of the consumed game content. For example, the amount of change in the game parameter may increase as the number (amount) of the consumed game content is larger, or as the rarity of the consumed game content is higher.

Next, the structural components of the game system 10 are described. The server 11 includes a server communication interface 14, a server memory 15, and a server controller 16.

The server communication interface 14 is an interface that communicates with an external device via a wired or wireless connection to transmit and receive information. In this embodiment, the server communication interface 14 transmits and receives information to and from the terminal devices 12 via the network 13.

The server memory 15 is, for example, a storage device storing a variety of information and programs necessary for providing and controlling the game.

The server memory 15 stores for example information related to objects placed in a virtual space for each user. For instance, FIG. 2 illustrates an example of information related to objects associated with one user. Specifically, the information related to objects includes shape data, placing information, and information related to first game contents, all associated with an object ID. The object ID is information that can uniquely identify an object.

The shape data is information indicating the shape of an object.

The placing information is information indicating placement of objects in a virtual space. In this embodiment, the placing information includes positioning information on each of the objects placed in the virtual space (for example, coordinate information on the coordinate system defined in the virtual space) and direction information indicating the direction faced by objects placed in the virtual space (for example, direction vectors of the coordinate system defined in the virtual space), but the placing information may include any information related to placement of objects in the virtual space. Once an object is placed in the virtual space in the first game stage, the placing information is associated with the object ID.

Hereinafter, "placing" an object, for example, is described as including the association of placing information with the object.

The information related to first game contents includes a game parameter, intra-object placing information, and placing information, all associated with a first game content ID.

The first game content ID is information that can uniquely identify a first game content. In this embodiment, two or more first game content IDs are associated with one object ID.

The game parameters include a variety of parameters that are related to the game content and are necessary for game progress. The game parameters included in the information related to first game contents are, for example, used in the second game stage executed by another user's terminal device 12. In this embodiment, the game parameters included in the information related to first game contents include type, attribute, level, experience points, and HP.

The type indicates the type of the first game content. For example, in the second game stage executed by another user's terminal device 12, each first game content has a different role, function, effect, and the like in accordance with the type. In this embodiment, the types of first game contents include an artillery battery, land mine, factory, stope, commanding character, and the like, but the types are not limited to these examples.

The artillery battery automatically attacks (by cannon fire) a second game content of another user that is placed in the virtual space in the second game stage executed by the other user's terminal device 12. The HP of the second game content are reduced by the amount of damage inflicted by the cannon fire. For example, when the HP of the other user's second game content reach zero, it is determined that the other user has failed to complete the game task.

The land mine inflicts damage upon contact to a second game content of another user that is placed in the virtual space in the second game stage executed by the other user's terminal device 12.

The factory generates, for example, a predetermined game content or points after a predetermined time elapses in another game stage executed by the user's terminal device 12. Specifically, a game content with which the user was not associated becomes associated with the user and stored, or the points associated with the user increase, in accordance with passage of a predetermined time.

The slope generates, similar to the factory, for example, a predetermined game content after a predetermined time elapses in another game stage executed by the user's terminal device 12. The generated game content is associated with the user. The factory and the stope may generate the same or different game contents.

The commanding character battles the other user's second game content in the second game stage executed by the other user's terminal device 12. As described below, upon the commanding character losing a battle with the other user's second game content, it may be determined that the other user has succeeded in completing the game task.

The attribute illustrated in FIG. 2 is information indicating a hierarchical relationship among game contents. In this embodiment, the attribute for example indicates at least one attribute from among the attributes of fire, wood, and water. For example, a game content with the fire attribute inflicts greater damage than usual on a game content with the wood attribute and less damage than usual on a game content with the water attribute. The types of attributes are not limited to fire, wood, and water, and any types of attributes may exist.

The level is a parameter indicating the degree of growth of a first game content. For example, when the level increases, other game parameters change (for example, the maximum of HP increases). In this embodiment, the level has a minimum value (e.g. 0 points) and a maximum value (e.g. 100 points).

Figures 3, 4:
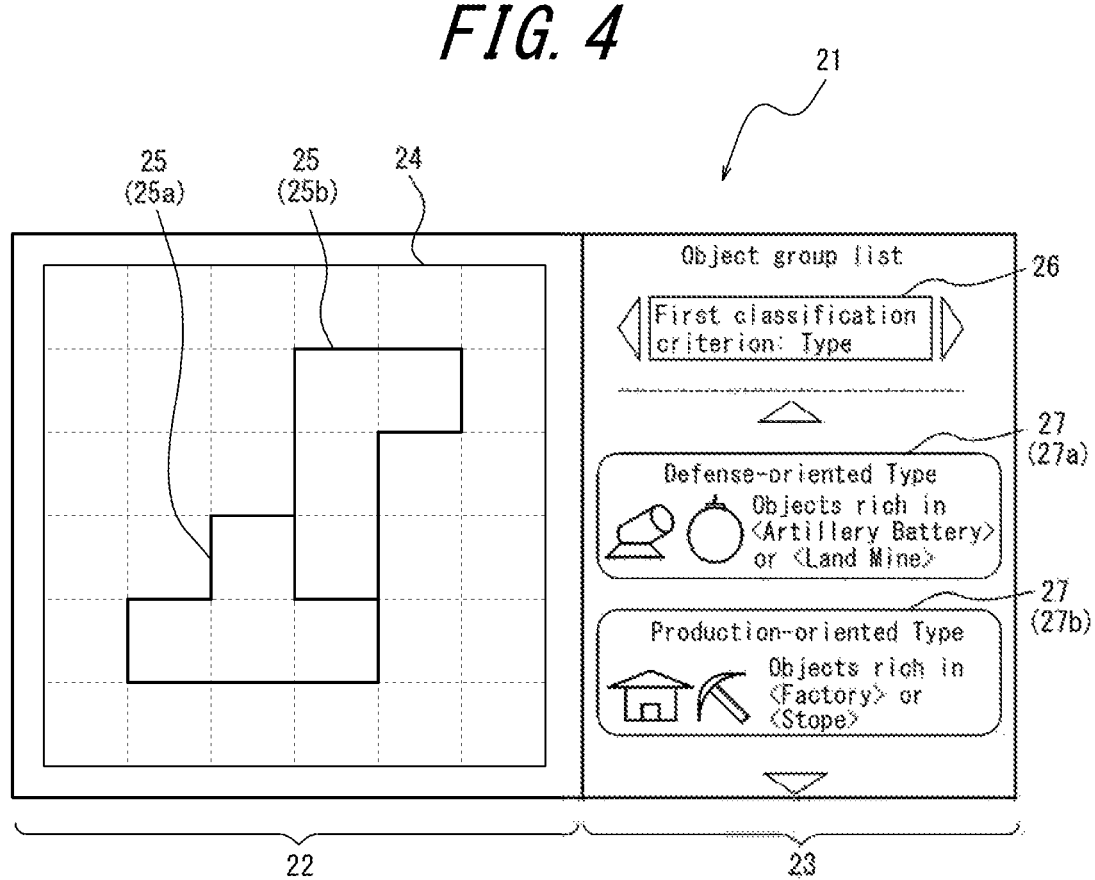
FIG. 3 illustrates the relationship between the level and experience points of first game contents.
FIG. 4 illustrates an example of a first screen.

The experience points are a parameter for deciding on the level of a first game content. The level is set based on the experience points. For the sake of convenience, in this embodiment, for example a configuration is described in which the level is n when the experience points are 100n or more and less than 100(n+1), as illustrated in FIG. 3. However, the correspondence relationship between the level and the experience points is not limited to the configuration. The minimum experience points corresponding to any level (in this embodiment, experience points of 100n corresponding to level n) will also be referred to hereinafter as a reference value. In this embodiment, two or more possible reference values are set for the experience points. The experience points may change in the third game stage as described below. However, the experience points may, for example, change in another game stage executed by the user's terminal device 12 or in the second game stage executed by the other user's terminal device 12. In this embodiment, the experience points have a minimum value (e.g. 0 points) and a maximum value (e.g. 10,000 points).

The HP illustrated in FIG. 2 are a parameter that decrease for example due to an attack by a second game content of another user in the second game stage executed by the other user's terminal device 12. For example when the HP reach zero, the first game content is determined to have lost. The role, function, effect, and the like, such as cannon fire, movement, or attacking, of the first game content that has lost are suspended. In this embodiment, the HP have the maximum, and the current value of the HP can take a value from zero to the maximum.

The game parameters are not limited to the examples described above and may, for example, include any parameters used for game progress, such as attack strength, defense strength, and the like.

The intra-object placing information is information indicating placement of first game contents within an object. In this embodiment, the intra-object placing information includes intra-object positioning information indicating the position, within the object, of first game contents placed within the object and direction information indicating the direction faced by first game contents placed within the object, but the intra-object placing information may include any information related to placement of first game contents within an object. In this way, placement of each first game content is fixed with respect to the object. In this embodiment, the intra-object placing information is set in advance for each first game content, but for example a configuration may be adopted to allow the user to change the intra-object placing information using the terminal device 12.

The placing information is information indicating placement of first game contents in a virtual space. In this embodiment, the placing information includes positioning information and direction information on each of the first game contents placed in a virtual space, but the placing information may include any information related to placement of first game contents in the virtual space.

The placing information associated with the first game content is determined based on the placing information associated with an object, as described above, and on intra-object placing information associated with the first game content.

Specifically, when placing information is associated with an object by execution of the first game stage, then the placing information of each of the first game contents in the virtual space is determined based on the placing information of the object and on the intra-object placing information associated with the first game contents. According to this configuration, when one object is placed in the virtual space, two or more first game contents associated with the object are collectively placed in the virtual space, and therefore as compared to a configuration in which for example the user places a plurality of first game contents one by one in the virtual space, the complexity of user operation and the burden on the user to handle game contents are eased.

While the case of storing information related to objects in the server memory 15 has been described, this information related to objects may be shared by being stored in both the server 11 and the user's terminal device 12. For example, when information related to objects is updated on one of the server 11 and the terminal device 12, information relating to the update is transmitted to the other one so that the server 11 and the terminal device 12 both store identical information.

In addition to the information related to objects, the server memory 15 may include, for each user, any information necessary for game play by the user, such as information related to game contents possessed by the user in the game, the user's level, and the like.

The server controller 16 illustrated in FIG. 1 is, for example, a dedicated microprocessor or a CPU that implements specific functions by reading a specific program. The server controller 16 controls the overall operations of the server 11. For example, the server controller 16 transmits and receives information via the server communication interface 14.

The server controller 16 also stores information related to objects in the server memory 15.

As described above, the server controller 16 stores the same information related to the user as is stored on the user's terminal device 12.

Specifically, the server controller 16 transmits information, related to objects, associated with the user to the user's terminal device 12 to cause the terminal device 12 to store the information. Upon updating the information, related to objects, that is stored in the server memory 15, the server controller 16 transmits information relating to the update, among the information related to the object, to the terminal device 12 of the corresponding user.

Specifically, upon receiving, from the user's terminal device 12, information relating to an update among information related to objects, the server controller 16 uses the information to update the information, related to objects, that is stored in the server memory 15.

Upon receiving a request to start the first, second, or third game stage from the terminal device 12, the server controller 16 transmits an instruction to start the game stage relating to the request to the terminal device 12. This instruction includes information necessary for executing the game stage relating to the request, such as information related to objects.

The server controller 16 changes the game parameters of the first game content in accordance with passage of time at a predetermined time rate of change.

For example, if a game parameter of a first game content associated with the user changes as a result of the second game stage executed on another user's terminal device 12, then the server controller 16 changes the game parameter in accordance with passage of time at a predetermined time rate of change so as to cancel out the change to the game parameter. Specifically, if the HP of a first game content decrease as a result of the second game stage, then the server controller 16 increases the HP in accordance with passage of time at a predetermined time rate of change, up to the maximum.

In another example, if a first game content associated with the user enters a predetermined state as a result of the second game stage executed on another user's terminal device 12, then the server controller 16 changes a game parameter of the first game content in accordance with passage of time at a predetermined time rate of change. Specifically, if a first game content (such as the factory) enters a predetermined state (such as being on fire) as a result of the second game stage, then the HP of the first game content decrease in accordance with passage of time at a predetermined time rate of change.

The time rate of change of the game parameters may, for example, be determined based on any game parameter, such as the type or level of the first game content. For example, as the level of the first game content is higher, the time rate of change of the game parameter increases or decreases. In this way, the server controller 16 changes the game parameters of the first game contents at a predetermined time rate of change, for example regardless of whether the user is playing the game using the terminal device 12. According to this configuration, a game that progresses in real time is implemented, even when the user for example intermittently plays the game, i.e. when there are periods in which the user is not playing the game.

Next, the terminal device 12 illustrated in FIG. 1 is described. The terminal device 12 includes a terminal communication interface 17, a terminal memory 18, a display 19, and a terminal controller 20.

The terminal communication interface 17 is an interface that communicates with an external device via a wired or wireless connection to transmit and receive information. In this embodiment, the terminal communication interface 17 transmits and receives information to and from the server 11 via the network 13.

The terminal memory 18 is, for example, a storage device storing a variety of information and programs necessary for executing the game provided by the server 11. The terminal memory 18 also stores, in advance, an application for the game according to this embodiment that is downloaded from another external server other than the server 11, for example.

The display 19 is a display device, such as a liquid crystal display or an organic EL display, and displays a variety of screens relating to the game provided by the server 11. The display 19 may, for example, be configured with a touch panel to function as an interface that detects user operation.

The terminal controller 20 is, for example, a dedicated microprocessor or a CPU that implements specific functions by reading a specific program. The terminal controller 20 controls the overall operations of the terminal device 12. For example, the terminal controller 20 transmits and receives information via the terminal communication interface 17. The terminal controller 20 also executes a game application in response to a user operation on the display 19.

As described above, the terminal controller 20 stores, in the terminal memory 18, the same information related to objects as is stored in the server 11.

Specifically, upon receiving information related to objects from the server 11, the terminal controller 20 stores the received information in the terminal memory 18. Upon updating the information, related to objects, that is stored in the terminal memory 18, the terminal controller 20 transmits information relating to the update, among the information related to objects, to the server 11.

Furthermore, upon receiving information relating to an update, among the information related to objects, from the server 11, the terminal controller 20 uses this information to update the information, related to objects, that is stored in the terminal memory 18.

The terminal controller 20 also executes processing for the first game stage. For example, the terminal controller 20 transmits a request to start the first game stage to the server 11 and receives an instruction to start the first game stage from the server 11. The instruction to start the first game stage includes information necessary for executing the first game stage, such as information related to the user's objects. Next, the terminal controller 20 displays a predetermined screen on the display 19 and places objects in a virtual space in response to a variety of user operations on the screen. Next, the terminal controller 20 associates placing information with the placed objects and with first game contents associated with the objects, and updates the information, related to objects, that is stored in the terminal memory 18. The terminal controller 20 then transmits information relating to the update (for example, the placing information associated with the objects and the placing information associated with the first game contents), among the information related to objects, to the server 11.

The terminal controller 20 also executes processing for the second game stage. For example, the terminal controller 20 transmits a request to start the second game stage to the server 11 and receives an instruction to start the second game stage from the server 11. The instruction to start the second game stage includes information necessary for executing the second game stage, such as information related to another user's objects. Next, the terminal controller 20 places the other user's first game content and the user's second game content in a virtual space. Next, the terminal controller 20 displays a predetermined screen on the display 19 and operates the second game content in response to a variety of user operations on the screen. Next, upon satisfaction of a predetermined condition, such as the second game content winning a battle against the other user's first game content, for example, commanding character, the terminal controller 20 determines that the game task has been successfully completed by the user. The terminal controller 20 then transmits result information including the result of the determination to the server 11.

The terminal controller 20 also executes processing for the third game stage. Details are provided below.

First, the terminal controller 20 transmits an instruction to start the third game stage to the server 11.

Next, the terminal controller 20 receives an instruction to start the third game stage from the server 11, which received the request to start the third game stage. The instruction to start the third game stage includes information necessary for executing the third game stage, such as information related to the user's objects.

Next, the terminal controller 20 displays a first screen on the display 19 and starts the third game stage.

Figure 5:
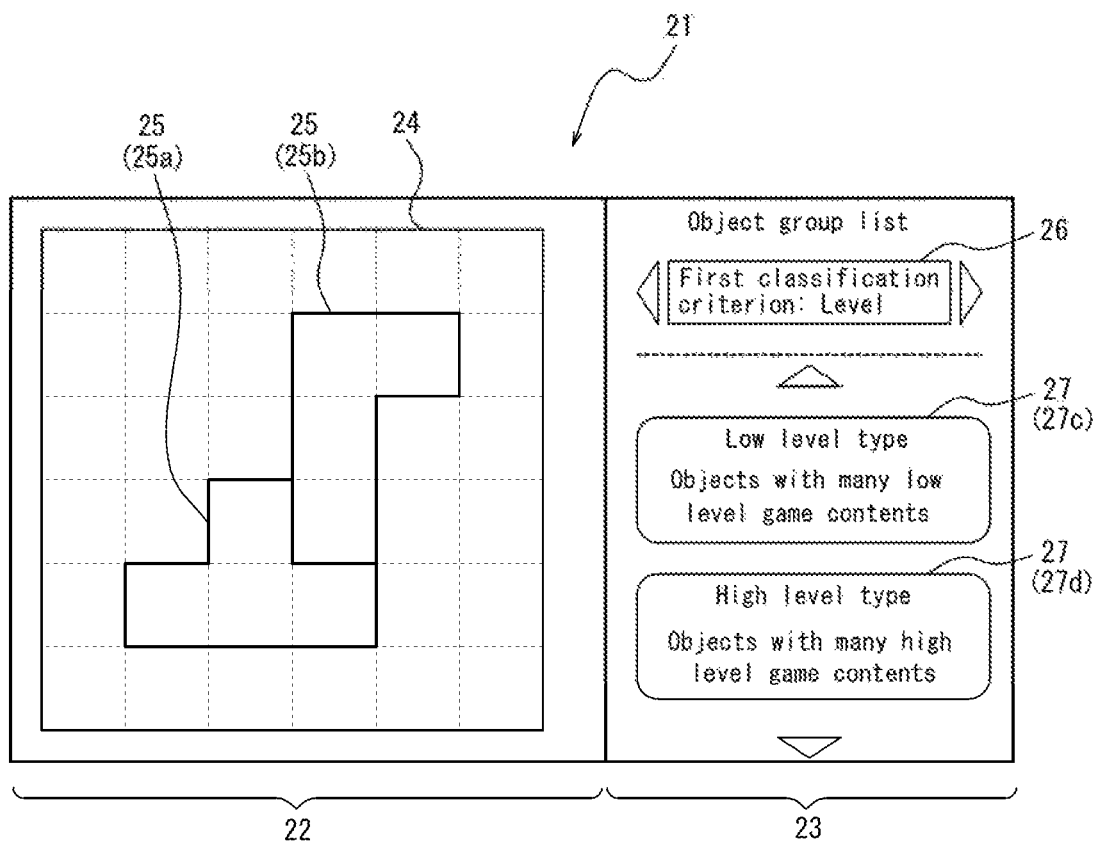
FIG. 5 illustrates an example of the first screen.
Figure 6:
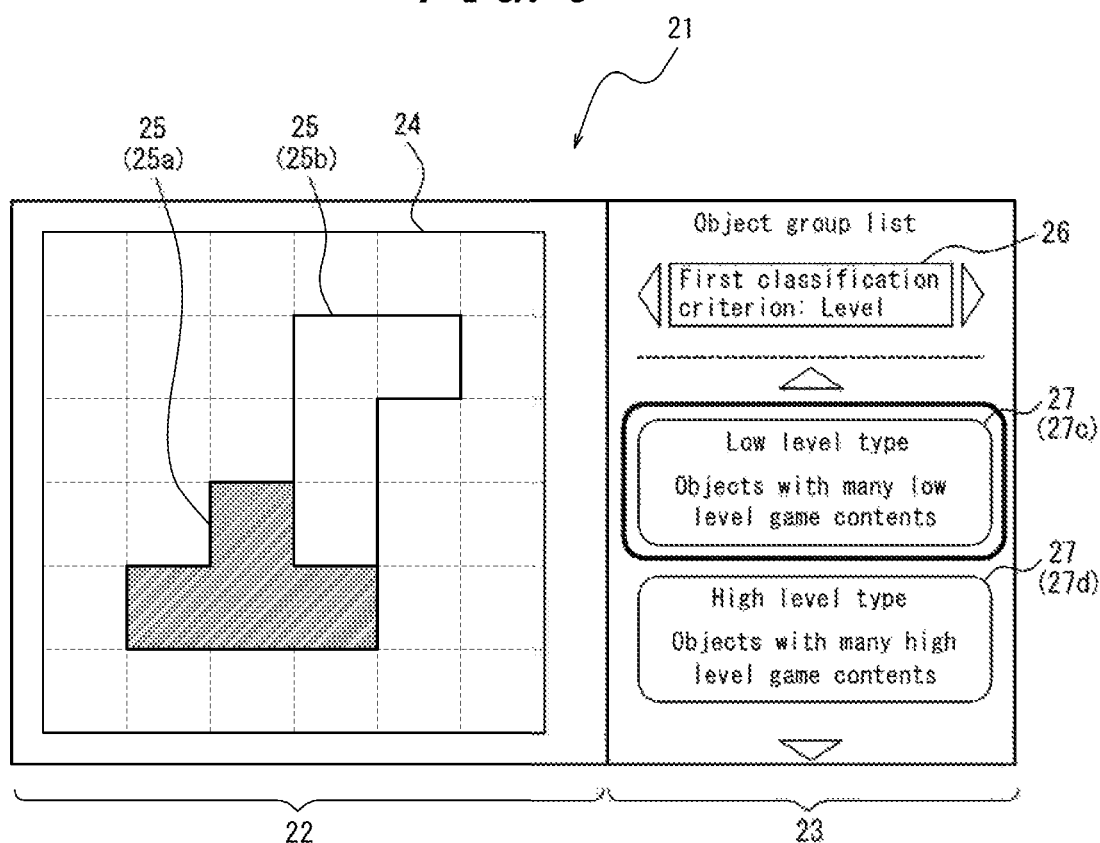
FIG. 6 illustrates an example of the first screen.

With reference to FIGS. 4 to 6, the following describes the processing performed by the terminal controller 20 with the first screen 21 displayed on the display. The first screen 21 includes, for example as illustrated in FIG. 4, a display area 22 for the first virtual space and a list 23 of object group.

The display area 22 for the first virtual space is an area in which a virtual space 24 and an object 25 placed in the virtual space 24 are displayed. In FIG. 4, the virtual space 24 is partitioned into a plurality of substantially square area (divided by dashed lines in FIG. 4). In FIG. 4, two objects 25a and 25b are displayed. In this embodiment, the objects 25 have a shape that is in units of the substantially square areas included in the virtual space 24, and is formed by combining one or more substantial squares.

The list 23 of object group is an area in which a button 26 of first classification criterion and an object group button 27 are displayed.

The button 26 of first classification criterion is an interface for accepting a user operation to switch the selected one of a plurality of criteria (first classification criteria) for classifying objects 25 placed in the virtual space 24. The selected first classification criterion (in FIG. 4, "Type") is displayed in the button 26 of first classification criterion. Upon detecting a user operation on the button 26 of first classification criterion, the terminal controller 20 switches the selected first classification criterion to another first classification criterion.

The first classification criteria are described below. In this embodiment, the first classification criteria include for example "Type," "Level," and "Placement," but any other first classification criterion may be provided. The terminal controller 20 classifies, based on the information related to objects, each of the objects 25 placed in the virtual space 24 under at least one of a plurality of object groups (categories) corresponding to the selected first classification criterion. For each object group, a predetermined condition (first classification condition) is determined that is used for the determination of whether or not the object 25 is classified under the object group. The first classification condition is a condition that can be determined according to the information related to the object.

Specifically, object groups "Defense-oriented Type" and "Production-oriented Type" for example correspond to the first classification criterion "Type." For "Defense-oriented Type," a first classification criterion is determined such that, for example, the type of first game contents that are the highest in terms of a predetermined parameter (for example, level) or that are the highest in number, among the first game contents associated with the object 25, is "Artillery Battery" or "Land Mine." For "Production-oriented Type," a first classification criterion is determined such that, for example, the type of first game content that are the highest in terms of a predetermined parameter (for example, level) or that are the highest in number, among the first game contents associated with the object 25, is "Factory" or "Stope." Object groups corresponding to the first classification criterion "Type" are not limited to the examples described above and may include an object group for which any first classification condition that can be determined according to the type of the first game content is determined.

For example, when the selected first classification criterion is "Type," the terminal controller 20 identifies, for each of the objects placed in the virtual space, the type of first game contents that have the highest level or that is the highest in number, among the first game contents associated with the object. If the identified type of first game contents is "Artillery Battery" or "Land Mine," then the terminal controller 20 classifies the object under "Defense-oriented Type." If the identified type of first game contents is "Factory" or "Stope," then the terminal controller 20 classifies the object under "Production-oriented Type."

Object groups "Low level Type" and "High Level Type" for example correspond to the first classification criterion "Level." For "Low level Type," a first classification condition is determined such that the average of the level of all of the first game contents associated with the object is within a first range (e.g. 0 or more and less than 5). For "High Level Type," a first classification condition is determined such that the average of the level of all of the first game contents associated with the object is within a second range (e.g. 5 or more and less than 10) that includes values beyond the first range. Object groups corresponding to the first classification criterion "Level" are not limited to the examples described above and may include an object group for which any first classification condition that can be determined according to the level of the first game content is determined.

For example, when the selected first classification criterion is "Level," the terminal controller 20 averages, for each of the objects placed in the virtual space, the level of all of the first game contents associated with the object. If the average is within the first range, then the terminal controller 20 classifies the object under "Low level Type." If the average is within the second range, then the terminal controller 20 classifies the object under "High Level Type."

Object groups "Short Range Type" and "Long Range Type" for example correspond to the first classification criterion "Placement." For "Short Range Type," a first classification condition is determined such that the distance or the difference of elevation between the position of the object in the virtual space and a predetermined position is smaller than a predetermined threshold (e.g. less than 100). For "Long Range Type," a first classification condition is determined such that the distance or the difference of elevation between the position of the object in the virtual space and the predetermined position is equal to or greater than a predetermined threshold (e.g. 100 or more). The predetermined position is for example the position of a particular first game content such as a commanding character, the position at which a second game content of another user is placed at the start of the second game stage, or the like, yet may be any position in the virtual space. Object groups corresponding to the first classification criterion "Placement" are not limited to the examples described above and may include an object group for which any first classification condition that can be determined according to the placing information of the object is determined.

For example, when the selected first classification criterion is "Placement," the terminal controller 20 calculates, for each of the objects placed in the virtual space, the distance or the difference of elevation between the position of an object in the virtual space and the predetermined position. If the calculated distance or difference of elevation is smaller than the predetermined threshold, then the terminal controller 20 classifies the object under "Short Range Type." If the calculated distance or difference of elevation is equal to or greater than the predetermined threshold, then the terminal controller 20 classifies the object under "Long Range Type."

Each object group button 27 is provided for an individual object group corresponding to the selected first classification criterion. Each object group button 27 is an interface for accepting a user operation to select the object 25 classified under the corresponding object group. For example, in FIG. 4 the selected first classification criterion is "Type." In this case, the terminal controller 20 displays two object group buttons 27a and 27c respectively corresponding to "Defense-oriented Type" and "Production-oriented Type." Upon detecting a user operation for example on the object group button 27a corresponding to "Defense-oriented Type," the terminal controller 20 selects at least one object 25 classified under "Defense-oriented Type," yet may select all of the objects 25 classified under "Defense-oriented Type." This configuration enables collective selection of objects that are classified in accordance with a variety of first classification criteria, thereby reducing the burden on the user to select objects.

Alternatively, each object group button 27 may be provided for an individual object 25 classified under an individual object group corresponding to the selected first classification criterion. In this configuration, each object group button 27 functions as an interface for accepting a user operation to select one corresponding object 25.

Next, upon detecting a user operation on the button 26 of first classification criterion, the terminal controller 20 switches the selected first classification criterion to another first classification criterion. For example, as illustrated in FIG. 5, the selected first classification criterion is switched from "Type" to "Level." The terminal controller 20 then displays two object group buttons 27c and 27d respectively corresponding to "Low level Type" and "High Level Type."

Next, upon detecting a user operation for example on the object group button 27c corresponding to "Low level Type," the terminal controller 20 changes, as illustrated in FIG. 6, the state in which the object 25 classified under "Low level Type" (for example, the object 25a) is displayed in the display area 22 for the first virtual space to another displaying state recognizable to the user (in which for example the color of the object is changed, the object is caused to blink, or a predetermined marker image is superimposed on the object). Upon detecting a user operation on an object 25 displayed in the display area 22 for the first virtual space, the terminal controller 20 may execute the same processing as it does upon detecting a user operation on the object group button 27 corresponding to the object group under which the object 25 is classified. Upon detecting another user operation on the object group button 27c corresponding to "Low level Type," the terminal controller 20 selects at least one object (for example, the object 25a) corresponding to the object group button 27c. The terminal controller 20 then displays a second screen on the display 19.

Figure 7:
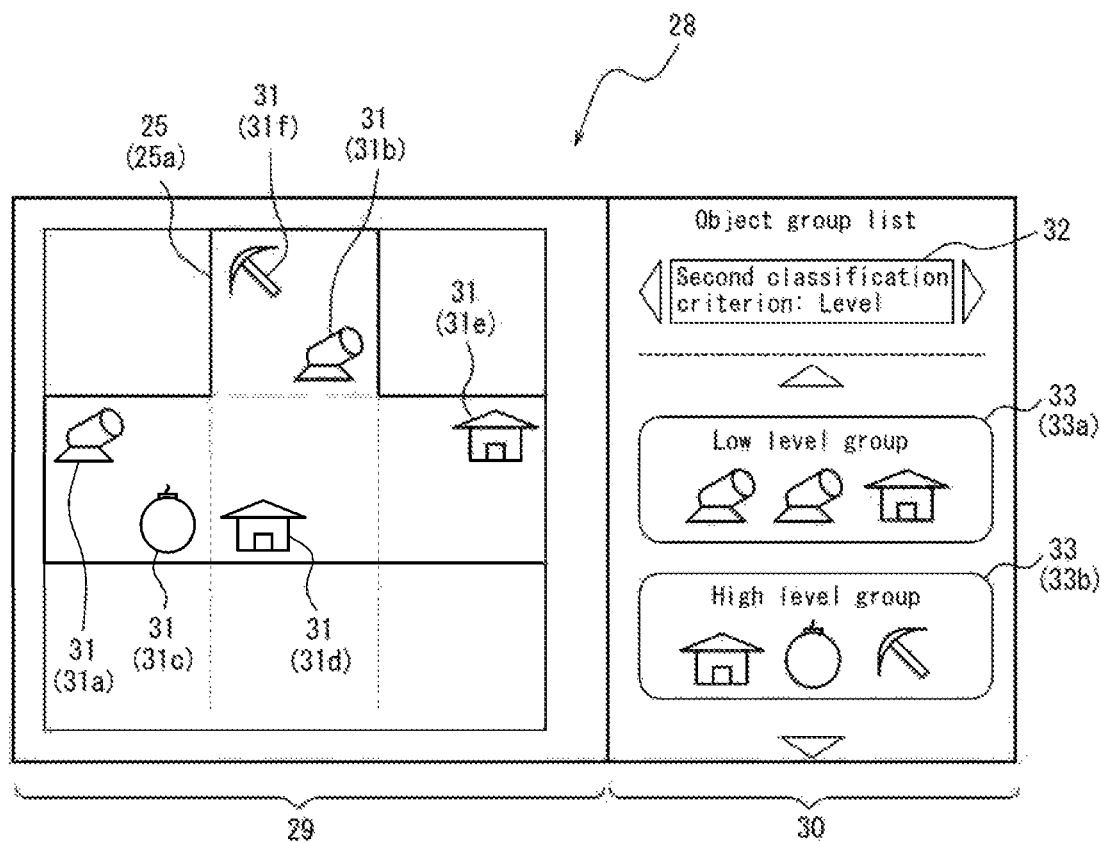
FIG. 7 illustrates an example of a second screen.
Figure 8:
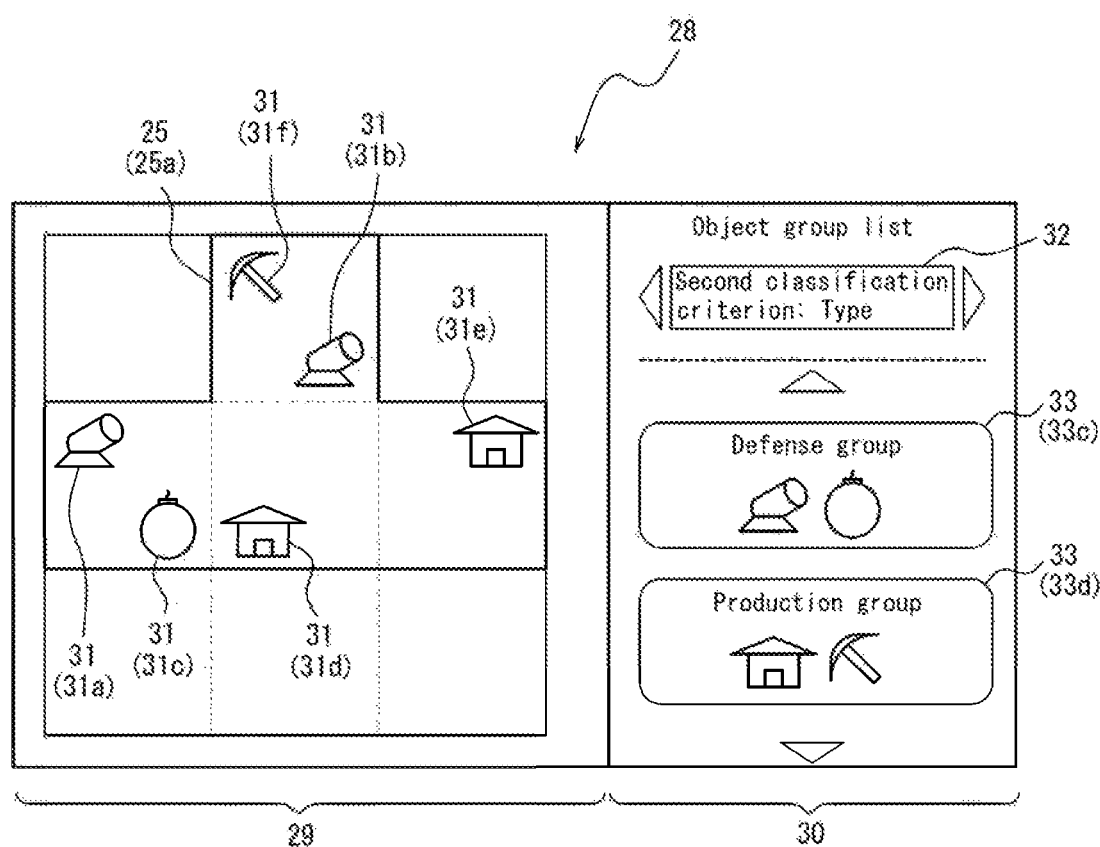
FIG. 8 illustrates an example of the second screen.
Figure 9:
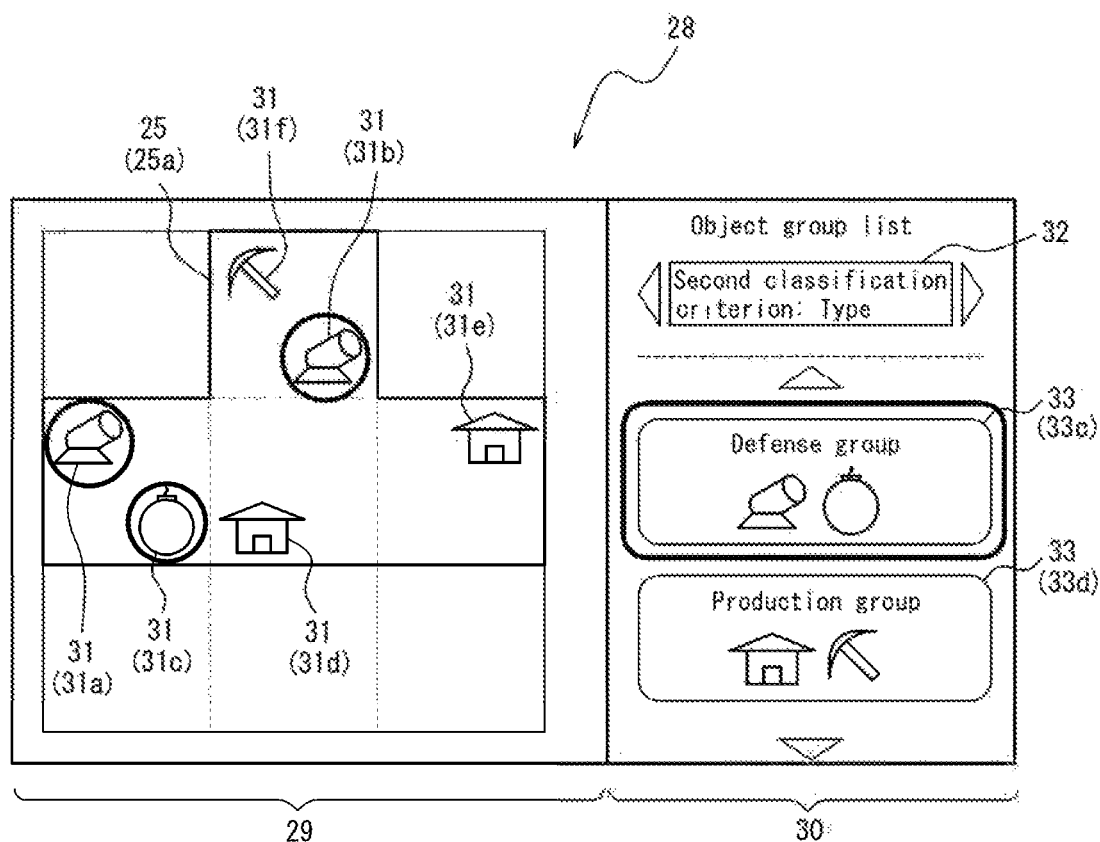
FIG. 9 illustrates an example of the second screen.

Next, with reference to FIGS. 7 to 9, the following describes the processing performed by the terminal controller 20 with the second screen 28 displayed on the display. The second screen 28 includes, for example as illustrated in FIG. 7, a display area 29 for objects and a list 30 of first content group.

The display area 29 for objects is an area in which an object 25 selected in the first screen 21 and first game contents 31 associated with the object 25 are displayed. For example, in FIG. 7 a total of six first game contents 31, i.e. two artillery batteries 31a, 31b, one land mine 31c, two factories 31*d*, 31*e*, and one stope 31*f*, all associated with the object 25*a*, are displayed in the display area 29 for objects.

The list 30 of first content group is an area in which a button 32 of second classification criterion and a button 33 of first content group are displayed.

The button 32 of second classification criterion is an interface for accepting a user operation to switch the selected one of a plurality of criteria (second classification criteria) for classifying first game contents 31 associated with the object 25 selected in the first screen 21. The selected second classification criterion (in FIG. 7, "Level") is displayed in the button 32 of second classification criterion. Upon detecting a user operation on the button 32 of second classification criterion, the terminal controller 20 switches the selected second classification criterion to another second classification criterion.

The second classification criteria are described below. In this embodiment, the second classification criteria include for example "Level," "Type," and "Placement," but any other second classification criterion may be provided. The terminal controller 20 classifies, based on the information related to first game contents 31 associated with the object 25 selected in the first screen 21, each of the first game content 31 under at least one of a plurality of first content groups (categories) corresponding to the selected second classification criterion. For each first content group, a predetermined condition (second classification condition) is determined that is used for the determination of whether or not the first game content 31 is classified under the first content group. The second classification condition is a condition that can be determined according to the information related to the first game content 31.

Specifically, first content groups "Low level Group" and "High Level Group" for example correspond to the second classification criterion "Level." For "Low level Group," a second classification condition is determined such that the level of first game contents 31 is within a third range (e.g. 0 or more and less than 5). For "High Level Group," a second classification condition is determined such that the level of first game contents is within a fourth range (e.g. 5 or more and less than 10) that includes values beyond the third range. First content groups corresponding to the second classification criterion "Level" are not limited to the examples described above and may include a first content group for which any second classification criterion that can be determined according to the level of the first game content is determined.

For example, when the selected second classification criterion is "Level," the terminal controller 20 identifies the level of each first game content 31 associated with the object 25 selected in the first screen 21. If the identified level is within the third range, then the terminal controller 20 classifies the first game content 31 under "Low level Group." If the identified level is within the fourth range, then the terminal controller 20 classifies the first game content 31 under "High Level Group."

First content groups "Defense Group" and "Production Group" for example correspond to the second classification criterion "Type." For "Defense Group," a second classification condition is determined such that the type of the first game content 31 is "Artillery Battery" or "Land Mine." For "Production Group," a second classification condition is determined such that the type of the first game contents 31 is "Factory" or "Stope." First content groups corresponding to the second classification criterion "Type" are not limited to the examples described above and may include a first content group for which any second classification criterion that can be determined according to the type of the first game content 31 is determined.

For example, when the selected second classification criterion is "Type," the terminal controller 20 identifies the type of each first game content 31 associated with the object 25 selected in the first screen 21. Next, if the identified type is "Artillery Battery" or "Land Mine," then the terminal controller 20 classifies the first game content 31 under "Defense Group." If the identified type is "Factory" or "Stope," then the terminal controller 20 classifies the first game content 31 under "Production Group."

First content groups "Short Range Group" and "Long Range Group" for example correspond to the second classification criterion "Placement." For "Short Range Group," a second classification condition is determined such that the distance or the difference of elevation between the position of the first game content 31 in the virtual space 24 and a predetermined position is smaller than a predetermined threshold (e.g. less than 100). For "Long Range Group," a second classification condition is determined such that the distance or the difference of elevation between the position of the first game content 31 in the virtual space 24 and the predetermined position is equal to or greater than a predetermined threshold (e.g. 100 or more). Both the distance and the difference of elevation can be calculated based on the coordinates indicated by the positioning information of the first game content 31 and on the coordinates at the predetermined position. The predetermined position is for example the position of a particular first game content 31 such as a commanding character, the position at which a second game content of another user is placed at the start of the second game stage, or the like, yet may be any position in the virtual space 24. First content groups corresponding to the second classification criterion "Placement" are not limited to the examples described above and may include a first content group for which any second classification criterion that can be determined according to the placing information of the first game content 31 is determined.

For example, when the selected second classification criterion is "Placement," the terminal controller 20 calculates, for each of the first game contents 31 associated with the object 25 selected in the first screen 21, the distance or the difference of elevation between the position of the first game content and the predetermined position. If the calculated distance or difference of elevation is smaller than the predetermined threshold, then the terminal controller 20 classifies the first game content 31 under "Short Range Group." If the calculated distance or difference of elevation is equal to or greater than the predetermined threshold, then the terminal controller 20 classifies the first game content 31 under "Long Range Group."

Each button 33 of first content group is provided for an individual first content group corresponding to the selected second classification criterion. Each button 33 of first content group is an interface for accepting a user operation to select first game contents 31 classified under the corresponding first content group. For example, in FIG. 7 the selected second classification criterion is "Level." In this case, the terminal controller 20 displays two buttons 33*a* and 33*b* of first content group respectively corresponding to "Low Level Group" and "High Level Group." Upon detecting a user operation for example on the button 33*a* of first content group corresponding to "Low Level Group," the terminal controller 20 selects at least one first game content 31 classified under "Low Level group," yet, in this embodiment, selects a plurality of (for example, all) first game contents 31 classified under "Low Level Group." In this way, a plurality of first game contents 31 that are classified in accordance with a variety of second classification criterion can be selected collectively, and the burden on the user to select first game contents 31 is reduced.

Next, upon detecting a user operation on the button 32 of second classification criterion, the terminal controller 20 switches the selected second classification criterion to another second classification criterion. For example, as illustrated in FIG. 8, the selected second classification criterion is switched from "Level" to "Type." The terminal controller 20 then displays two buttons 33c and 33d of first content group respectively corresponding to "Defense Group" and "Production Group."

Next, upon detecting a user operation for example on the button 33c of first content group corresponding to "Defense Group," the terminal controller 20 changes, as illustrate in FIG. 9, the state in which the first game contents 31 classified under "Defense Group" (for example, two artillery batteries 31a, 31b and one land mine 31c) are displayed in the display area 29 for objects to another displaying state recognizable to the user (in which for example the color of the first game contents is changed, the first game contents are caused to blink, or a predetermined marker image is superimposed on the first game contents). Upon detecting a user operation on a first game content 31 displayed in the display area 29 for objects, the terminal controller 20 may execute the same processing as it does upon detecting a user operation on the button 33 of first content group corresponding to the first content group under which the first game content 31 is classified. Next, upon detecting another user operation on the button 33c of first content group corresponding to "Defense Group," the terminal controller 20 selects first game contents 31a, 31b, and 31c corresponding to the button 33c of first content group. In this way, for example, among two or more first game contents 31 associated with the object 25, a plurality of first game contents 31 classified under "Defense Group," in this case two artillery batteries 31a, 31b and one land mine 31c are selected. The terminal controller 20 then displays a third screen on the display 19.

Next, with reference to FIGS. 10 to 13, the following describes the third screen 34 and the processing performed by the terminal controller 20 with the third screen 34 displayed on the display. Overall, this processing includes changing predetermined game parameters (in this embodiment, the experience points) of a plurality of first game contents 31 that are selected in the second screen 28 (also referred to below simply as "the plurality of first game contents 31") in response to a predetermined user operation, and updating the game parameters to the changed values.

Figure 10:
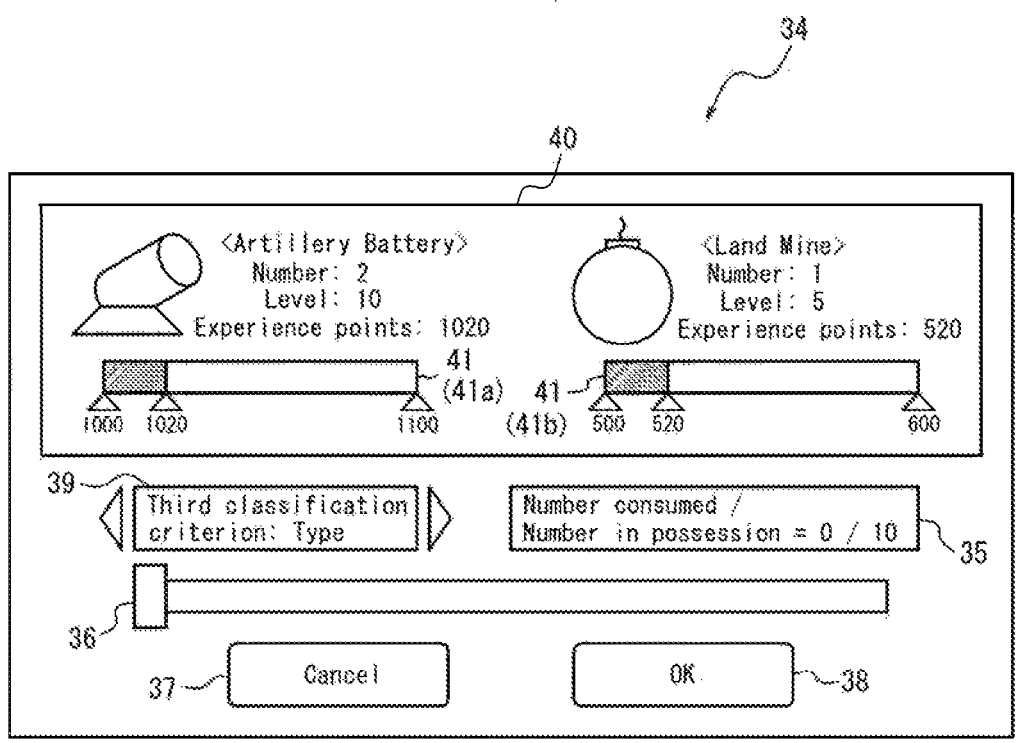
FIG. 10 illustrates an example of a third screen.

First, the third screen 34 is described. The third screen 34 includes, for example as illustrated in FIG. 10, a display area 35 for a first parameter, a slider 36, a cancel button 37, an OK button 38, a button 39 of third classification criterion, and a display area 40 for second content groups.

The display area 35 for a first parameter is an area in which a first parameter is displayed, indicating the number (amount) of the consumed predetermined game content (for example, virtual currency, an item, or the like) associated with the user or of the consumed predetermined points. The first parameter is also referred to below as the "number consumed," and the number of predetermined game contents associated with the user as the "number in possession." For example, in the display area 35 for a first parameter illustrated in FIG. 10, the first parameter (number consumed=0 points) and the number of predetermined game contents associated with the user (number in possession=10 points) are displayed.

The slider 36 is an interface for accepting a user operation (first user operation) to change the first parameter. Upon detecting a first user operation on the slider 36, the terminal controller 20 changes the position of the slider 36. The first parameter changes in accordance with a change in the position of the slider 36. As described below, the experience points of the plurality of first game contents 31, a plurality of second parameters, and a plurality of identification images indicating the plurality of second parameters may change in accordance with a change to the first parameter. The second parameters and identification images are described below.

The cancel button 37 is an interface for accepting a user operation to suspend the processing performed by the terminal controller 20 with the third screen 34 displayed on the display. Upon detecting a user operation on the cancel button 37, the terminal controller 20 displays for example the first screen 21 or the second screen 28 on the display 19, or alternatively ends the third game stage, without updating, for example, the experience points of the first game content 31 selected in the second screen 28 to the changed value.

The OK button 38 is an interface for accepting a user operation (third user operation) to end the processing performed by the terminal controller 20 with the third screen 34 displayed on the display. Upon detecting a third user operation on the OK button 38, the terminal controller 20 finalizes the experience points of the plurality of first game contents 31 and a plurality of second parameters at the time of the detection of the third user operation. Finalizing a parameter includes updating a parameter from the original value to the changed value and storing the result. The terminal controller 20 then displays for example the first screen 21 or the second screen 28 on the display 19, or alternatively ends the third game stage.

The button 39 of third classification criterion is an interface for accepting a user operation to switch the selected one of a plurality of criteria (third classification criteria) for classifying the plurality of first game contents 31. The selected third classification criterion (in FIG. 10, "Type") is displayed in the button 39 of third classification criterion. Upon detecting a user operation on the button 39 of third classification criterion, the terminal controller 20 switches the selected third classification criterion to another third classification criterion.

The third classification criteria are described below. In this embodiment, the third classification criteria include for example "Type," "First Game Content ID," and "Placement," but any other third classification criterion may be provided. The terminal controller 20 classifies, based on the information related to the plurality of first game contents 31, each of the first game contents 31 under at least one second content group, among a plurality of second content groups (categories) corresponding to the selected third classification criterion. For each second content group, a predetermined condition (third classification condition) is determined that is used for the determination of whether or not the first game content 31 is classified under the second content group. The third classification condition is a condition that can be determined according to the information related to the first game content 31.

Specifically, second content groups "Artillery Battery," "Land Mine," "Factory," and "Stope" for example correspond to the third classification criterion "Type." For "Artillery Battery," a third classification condition is determined such that the type of the first game content 31 is artillery battery. Similarly, for "Land Mine," a third classification condition is determined such that the type of the first game content 31 is land mine; for "Factory," a third classification condition is determined such that the type is factory; and for "Stope," a third classification condition is determined such that the type is stope. Second content groups corresponding to the third classification criterion "Type" are not limited to the examples described above and may include a second content group for which any third classification criterion that can be determined according to the type of the first game content 31 is determined.

For example, when the selected third classification criterion is "Type," the terminal controller 20 identifies the type of each of the plurality of first game contents 31. Next, the terminal controller 20 classifies each of the plurality of first game contents 31 under the second content group corresponding to the identified type. For example, in the case illustrated in FIG. 10, according to the third classification criterion "Type" two artillery batteries 31a and 31b are classified under the second content group "Artillery Battery," and one land mine 31c under the second content group "Land Mine."

A plurality of third content groups ("content001," "content002" . . . ) corresponding to a plurality of first game content IDs correspond to the classification criterion "First Game Content ID." For each third content group, a third classification condition is determined such that the first game content ID of the first game content 31 is identical to the first game content ID corresponding to the third content group.

For example, when the selected third classification criterion is "First Game Content ID," the terminal controller 20 identifies the first game content ID of each of the plurality of first game contents 31. Next, the terminal controller 20 classifies each of the plurality of first game contents 31 under the second content group corresponding to the identified first game content ID. Each first game content ID is unique to an individual first game content 31. For example, if n first game contents 31 are selected in the second screen 28, the n first game contents 31 are each classified under the corresponding one of n second content groups. This way, in this embodiment, one first game content may be classified under one second content group.

Second content groups "Short Range Group" and "Long Range Group" for example correspond to the third classification criterion "Placement." For "Short Range Group," a third classification condition is determined such that the distance or the difference of elevation between the position of the first game content 31 in the virtual space 24 and a predetermined position is smaller than a predetermined threshold (e.g. less than 100). For "Long Range Group," a third classification condition is determined such that the distance or the difference of elevation between the position of the first game content 31 in the virtual space 24 and the predetermined position is equal to or greater than a predetermined threshold (e.g. 100 or more). The predetermined position is for example the position of a particular first game content 31 such as a commanding character, the position at which a second game content of another user is placed at the start of the second game stage, or the like, yet may be any position in the virtual space 24. Second content groups corresponding to the third classification criterion "Placement" are not limited to the examples described above and may include a second content group for which any third classification criterion that can be determined according to the placing information of the first game content 31 is determined.

For example, when the selected third classification criterion is "Placement," the terminal controller 20 calculates, for each of the first game contents 31, the distance or the difference of elevation between the position of the first game content 31 and the predetermined position. If the calculated distance or difference of elevation is smaller than the predetermined threshold, then the terminal controller 20 classifies the first game content 31 under "Short Range Group." If the calculated distance or difference of elevation is equal to or greater than the predetermined threshold, then the terminal controller 20 classifies the first game content 31 under "Long Range Group."

The display area 40 for second content groups is an area in which, for each of the second content groups corresponding to the selected third classification criterion, information related to the second content group and an identification image 41 are displayed.

The information related to the second content group includes, but is not limited to, for example an image of the corresponding first game content 31 classified under the second content group, the number of a first game content 31, and the average or total of a predetermined game parameter. For example, in the display area 40 for second content groups illustrated in FIG. 10, images of first game contents, number of first game contents 31, average level, and average experience points are displayed.

Each identification image 41 is an image of a second parameter based on information related to a first game content 31 classified under the corresponding second content group, and is displayed in correspondence with the second content group. For example, in FIG. 10, an identification image 41a corresponding to the second content group "Artillery Battery" and an identification image 41b corresponding to the second content group "Land Mine" are displayed. Each second parameter is in this embodiment an average of the experience points of a first game content 31 classified under the corresponding second content group, yet it may be for example a total.

Each identification image 41 is in this embodiment an indicator, yet it may be any image, such as a pie chart, numeric image, or the like. As a second parameter increases, the corresponding indicator changes for example to move towards right. The left end of each indicator indicates the minimum value of the second parameter displayable by the identification image 41, and the right end indicates the maximum value of the second parameter displayable by the identification image 41.

For example, in FIG. 10, the current value of the second parameter of the second content group "Artillery Battery" is 1020 points. At this time, the left end of the identification image 41a corresponding to the second content group "Artillery Battery" corresponds to a first reference value (e.g. 1000 points) which is equal to or smaller than the current value of the second parameter, while the right end corresponding to a second reference value (e.g. 1100 points) which is greater than the current value of the second parameter. The first and second reference values are each, as described above, selected from among a plurality of reference values (0, 100, 200, . . . , 100 n, . . . ) that are set for the experience points (see FIG. 3). Similarly, the current value of the second parameter of the second content group "Land Mine" is 520 points. At this time, the left end of the identification image 41b corresponding to the second content group "Land Mine" corresponds to a first reference value (e.g. 500 points) which is equal to or smaller than the current value of the second parameter, while the right end corresponding to a second reference value (e.g. 600 points) which is greater than the current value of the second parameter.

In this embodiment, a second parameter and an identification image 41 indicating the second parameter change in accordance with a change to the first parameter. Operations of the terminal controller 20 to change a second parameter and the corresponding identification image 41 in accordance with a change to the first parameter are described below.

The following describes the processing performed by the terminal controller 20 with the third screen 34 displayed on the display. Once the first parameter changes in response to the above-mentioned first user operation on the slider 36, the terminal controller 20 changes, in accordance with a change to the first parameter, the experience points of at least one of a plurality of first game contents 31 and the second parameter corresponding to at least one of a plurality of second content groups.

In this case, the rate of change of the experience points or the rate of change of the second parameter with respect to the first parameter may be determined based on information related to first game contents 31. For example, as a predetermined game parameter (for example, level) of a first game content 31 is higher, the rate of change of the experience points of the first game content 31 with respect to the first parameter increases or decreases. For example, as the average of a predetermined game parameter (for example, the average of the level) of a first game content classified under a second content group is higher, the rate of change of the second parameter corresponding to the second content group with respect to the first parameter increases or decreases.

The rate of change of the experience points or second parameter with respect to the first parameter may be determined in response to a predetermined user operation (second user operation). For example, upon detecting a second user operation to select at least one of the plurality of first game contents 31, the terminal controller 20 increases or decreases the rate of change of the experience points of the selected first game content 31 with respect to the first parameter. The terminal controller 20 preferably decreases or increases the rate of change of a first game content 31 that is not selected to change inversely with the rate of change of the selected first game content 31. For example, upon detecting a second user operation to select at least one of the plurality of second content groups, the terminal controller 20 increases or decreases the rate of change of the second parameter corresponding to the selected second content group with respect to the first parameter. The terminal controller 20 preferably decreases or increases the rate of change of the second parameter corresponding to a second content group that is not selected to change inversely with the rate of change of the second parameter corresponding to the selected second content group. This configuration enables the user to promote or restrict the change to the experience points of the desired first game content 31 or in the second parameter corresponding to the desired second content group in accordance with a change to the first parameter.

The rate of change of the experience points of each of the plurality of first game contents 31 or the rate of change of each of the plurality of second parameters with respect to the first parameter are not limited to the examples described above and may be set freely.

In this case, each time the first parameter changes, the terminal controller 20 may change the experience points of all of the plurality of first game contents 31 or the second parameters of all of the plurality of second content groups. Alternatively, each time the first parameter changes, the terminal controller 20 may change, in a predetermined order or with a predetermined frequency, the experience points of at least one of the plurality of first game contents 31 or the second parameter of at least one of the plurality of second content groups. Details are provided below.

First, specific operations of the terminal controller 20 to change the experience points of at least one of the plurality of first game contents 31 in a predetermined order is described. The terminal controller 20 first determines the order (first-, second-, . . . , $n^{th}$-order) of for example a plurality of first game contents 31a, 31b, 31c. In this case, one first game content may be given a plurality of orders. For example, the first game content 31a is determined to have the first-order and the third-order, the first game content 31b the second-order, and the first game content 31c the fourth-order. Each time the first parameter changes, the terminal controller 20 changes the experience points of at least one of the plurality of first game contents 31 in the determined order.

When the first parameter first changes from zero to one point, for example, the experience points of the first game content 31a in the first order change. Then, when the first parameter changes from 1 to 2 points, the experience points of the first game content 31b in the second order change. Then, when the first parameter changes from 2 to 3 points, the experience points of the first game content 31a in the third order change. Then, when the first parameter changes from 3 to 4 points, the experience points of the first game content 31c in the fourth order change. When the first parameter further changes after the change of the experience points of the first game contents 31c in the last (in this case, fourth) order, the experience points of the first game content 31a in the first order change again.

Operations of the terminal controller 20 to change the second parameter of at least one of the plurality of second content groups in a predetermined order are performed in the same way as described above, and therefore a detailed description thereof is omitted.

Next, specific operations of the terminal controller 20 to change the experience points of at least one of the plurality of first game contents 31 with a predetermined frequency are described. The terminal controller 20 first determines the frequency of for example a plurality of first game contents 31a, 31b, 31c. The frequency is, for example, the amount of change in the first parameter or the number of changes of the first parameter necessary to cause the experience points to change, or the probability that the experience points change in accordance with a change in the first game content. Each time the first parameter changes, the terminal controller 20 changes the experience points of at least one of the plurality of first game content 31 with the determined frequency.

For a first game content 31 for which it is determined that the amount of change in the first parameter necessary to cause its experience points to change is two points, for example, the experience points change each time the first parameter changes by two points. For a first game content 31 for which it is determined that the number of changes of the first parameter necessary to cause its experience points to change is three times, for example, the experience points change once every three times the first parameter changes. For a first game content 31 for which it is determined that the probability that to its experience points change is 60%, for example, the experience points change with a probability of 60% each time the first parameter changes. Accordingly, for a given first game content 31, as the amount of change in the first parameter or the number of changes of the first parameter necessary to cause its experience points to change is smaller or the probability that its experience points change is higher, the frequency with which the experience points change in accordance with a change to the first parameter becomes higher.

Operations of the terminal controller 20 to change the second parameter of at least one of the plurality of second content groups with a predetermined frequency are performed in the same way as described above, and therefore a detailed description thereof is omitted.

The above-described order or frequency may be determined in response to, for example, a user operation to designate an order or frequency. For example, upon detecting a user operation to designate an order or frequency, the terminal controller 20 sets the designated value as the order or frequency.

Alternatively, the above-mentioned order or frequency may be determined based on the priority. Specifically, the terminal controller 20 sets the priority for determining the above-mentioned predetermined order or frequency of each first game content 31 or each second content group. For example, a higher order or a larger number of orders may be set for a first game content or second content group with a higher priority level. Alternatively, a higher frequency may be set for a first game content or a second content group with a higher priority level.

The priority is determined based on information related to the first game content 31. Specifically, the terminal controller 20 increases or decreases the priority of a first game content as, for example, a predetermined game parameter (such as the level or experience points) of the first game content is higher. The terminal controller 20 increases or decreases the priority of a first game content as, for example, the distance between a predetermined position in the virtual space and the position of the first game content is larger. The terminal controller 20 increases or decreases the priority of a first game content 31 as, for example, less experience points are required to increase the level of the first game content 31 by a predetermined point (for example, one point). The terminal controller 20 increases or decreases the priority of a first game content 31 as, for example, the rate of change of another game parameter (such as HP or attack strength) is higher with respect to the level of the first game content 31.

Specifically, the terminal controller 20 also increases or decreases the priority of a second content group as, for example, the average or total of a predetermined game parameter (such as the level or experience points) of each of the first game contents 31 classified under the second content group is higher. The terminal controller 20 increases or decreases the priority of a second content group as, for example, the average or total of the distance between a predetermined position in the virtual space and the position of each of the first game contents 31 classified under the second content group is larger. The terminal controller 20 increases or decreases the priority of a second content group as, for example, the average or total of the experience points required to increase the average of the level of each of the first game contents 31 classified under the second content group by a predetermined point (for example, one point) is smaller. The terminal controller 20 increases or decreases the priority of a second content group as, for example, the average or total of the rate of change of another game parameter (such as HP or attack strength) is higher with respect to the level of each of the first game contents 31 classified under the second content group.

Alternatively, the priority may be determined in response to a predetermined user operation. For example, upon detecting a user operation to select at least one of the plurality of first game contents 31, the terminal controller 20 increases or decreases the priority of the selected first game content 31. Alternatively, upon detecting a user operation to designate a value to be set as the priority of the selected first game content, the terminal controller 20 may set the designated value as the priority. Alternatively, for example, upon detecting a user operation to select at least one of the plurality of second content groups, the terminal controller 20 increases or decreases the priority of the selected second content group.

This configuration promotes the change in the experience points of a first game content with a higher priority or in the second parameter of a second content group with a higher priority, and thus offers a greater variety of changes in parameter, for example as compared to a configuration in which the experience points of the plurality of first game contents or the second parameters of the plurality of second content groups are changed uniformly. According to the disclosed configuration, the experience points of each of the plurality of first game contents or the second parameter of each of the plurality of second content groups are caused to change via the first parameter, which changes in response to a user operation on the slider 36. Therefore, for example as compared to a configuration in which each user operation is performed on an individual first game content 31, this configuration reduces the complexity of user operation to handle a plurality of first game contents 31.

Next, operations of the terminal controller 20 to change a second parameter and the corresponding identification image 41 in accordance with a change to the first parameter are described below. For simplicity, the following describes a configuration in which the experience points of each of the plurality of first game contents 31 increases or decreases by 50 points each time the first parameter increases or decreases by one point. Accordingly, the second parameter of each of the plurality of second content groups increases or decreases by 50 points each time the first parameter increases or decreases by one point.

For example, in FIG. 10, the current value of the second parameter of the second content group "Artillery Battery" is 1020 points. The first reference value corresponding to the left end of the identification image 41a corresponding to the second content group "Artillery Battery" is 1000 points, and the second reference value corresponding to the right end of the identification image 41a is 1100 points. Similarly, the current value of the second parameter of the second content group "Land Mine" is 520 points. The first reference value corresponding to the left end of the identification image 41b corresponding to the second content group "Land Mine" is 500 points, and the second reference value corresponding to the right end of the identification image 41b is 600 points.

Figure 11:
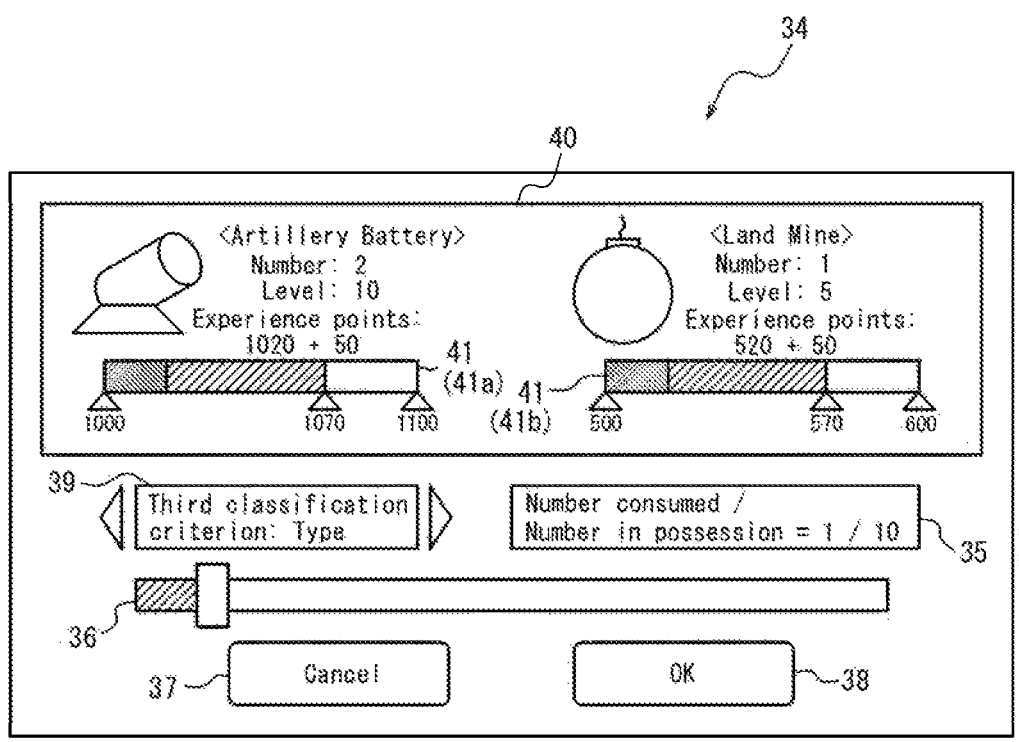
FIG. 11 illustrates an example of the third screen.

Next, for example in the state illustrated in FIG. 10, upon detecting a first user operation on the slider 36, the terminal controller 20 changes the first parameter. For example, the following describes the case of the first parameter increasing from 0 points to 1 point as illustrated in FIG. 11. In this case, three first game contents 31 (two artillery batteries 31a, 31b and one land mine 31c) respectively increase in experience points by 50 points. Accordingly, the second parameter corresponding to the second content group "Artillery Battery" increases by 50 points from the original (1020 points) to 1070 points. Similarly, the second parameter corresponding to the second content group "Land Mine" increases by 50 points from the original (520 points) to 570 points.

Preferably, for example as illustrated in FIG. 11, in the identification image 41, the original value of the second parameter and the amount of change are displayed in a distinguishable manner (for example, in different colors).

Figure 12:
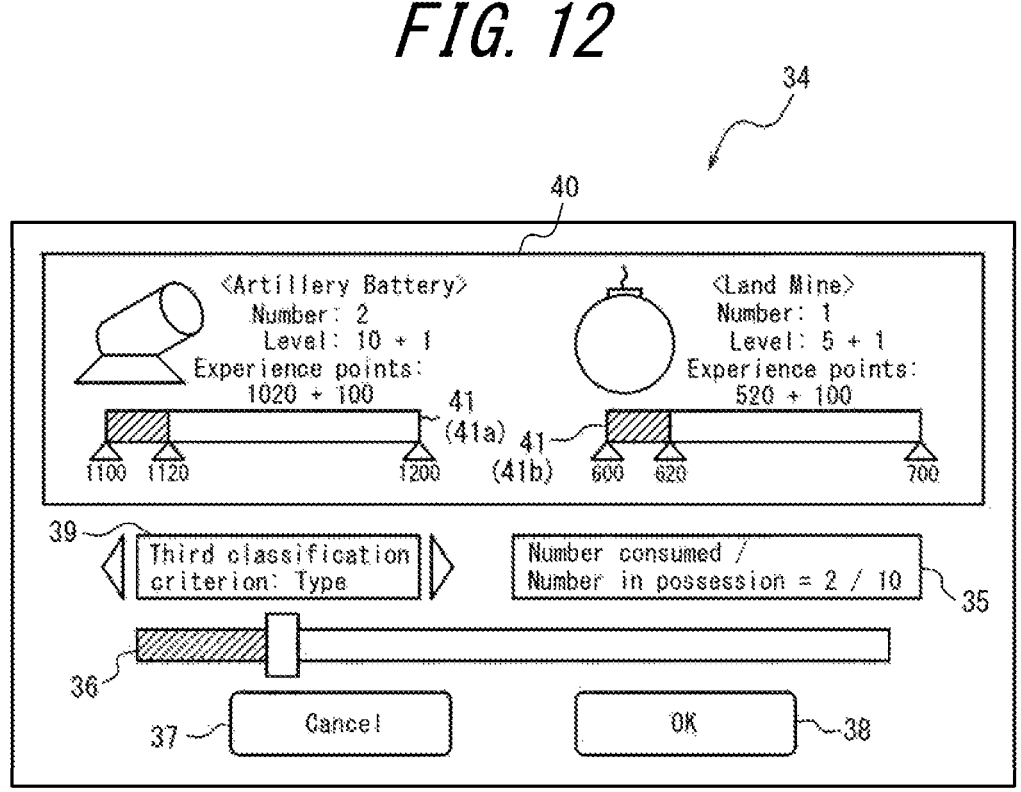
FIG. 12 illustrates an example of the third screen.

Next, for example in the state illustrated in FIG. 11, upon detecting another user operation on the slider 36, the terminal controller 20 further changes the first parameter. For example, the following describes the case of the first parameter increasing from 1 point to 2 points as illustrated in FIG. 12. In this case, three first game contents 31a, 31b, 31c further increase in experience points by 50 points respectively from the state illustrated in FIG. 11. Accordingly, the second parameter corresponding to the second content group "Artillery Battery" increases by another 50 points from 1070 points to 1120 points. Similarly, the second parameter corresponding to the second content group "Land Mine" increases by another 50 points from 570 points to 620 points.

The changed value (1120 points) of the second parameter corresponding to the second content group "Artillery Battery" is not smaller than the value at the right end of the identification image 41a in FIG. 11, i.e. the second reference value of 1100 points. In this case, the terminal controller 20 sets a reference value (for example, 1200 points) that is greater than the changed value (1120 points) of the second parameter as a new second reference value. The terminal controller 20 may also set another reference value (for example, 1100 points) that is equal to or smaller than the changed value (1120 points) of the second parameter and that is different from the first reference value as a new first reference value. In this way, for example as illustrated in FIG. 12, the value corresponding to the left end of the identification image 41a changes from 1000 points to 1100 points, and the value corresponding to the right end of the identification image 41a from 1100 points to 1200 points. Similarly, the value corresponding to the left end of the identification image 41b corresponding to the second content group "Land Mine" changes from 500 points to 600 points, and the value corresponding to the right end of the identification image 41b from 600 points to 700 points.

For example in the state illustrated in FIG. 12, upon detecting still another user operation on the slider 36, the terminal controller 20 further changes the first parameter. For example, the following describes the case of the first parameter decreasing from 2 points to 1 point as illustrated in FIG. 11. In this case, three first game contents 31a, 31b, 31c decrease in experience points by 50 points respectively from the state illustrated in FIG. 12. Accordingly, the second parameter corresponding to the second content group "Artillery Battery" decreases by 50 points from 1120 points to 1070 points. Similarly, the second parameter corresponding to the second content group "Land Mine" decreases by 50 points from 620 points to 570 points.

The changed value (1070 points) of the second parameter corresponding to the second content group "Artillery Battery" is smaller than the value at the left end of the identification image 41a in FIG. 12, i.e. the first reference value of 1100 points. In this case, the terminal controller 20 sets a reference value (for example, 1000 points) that is smaller than the changed value (1070 points) of the second parameter as a new first reference value. The terminal controller 20 may also set another reference value (for example, 1100 points) that is greater than the changed value (1070 points) of the second parameter and that is different from the second reference value as a new second reference value. In this way, for example as illustrated in FIG. 12, the value corresponding to the left end of the identification image 41a changes from 1100 points to 1000 points, and the value corresponding to the right end of the identification image 41a changes from 1200 points to 1100 points. Similarly, the value corresponding to the left end of the identification image 41b corresponding to the second content group "Land Mine" changes from 600 points to 500 points, and the value corresponding to the right end of the identification image 41b from 700 points to 600 points.

Figure 13:
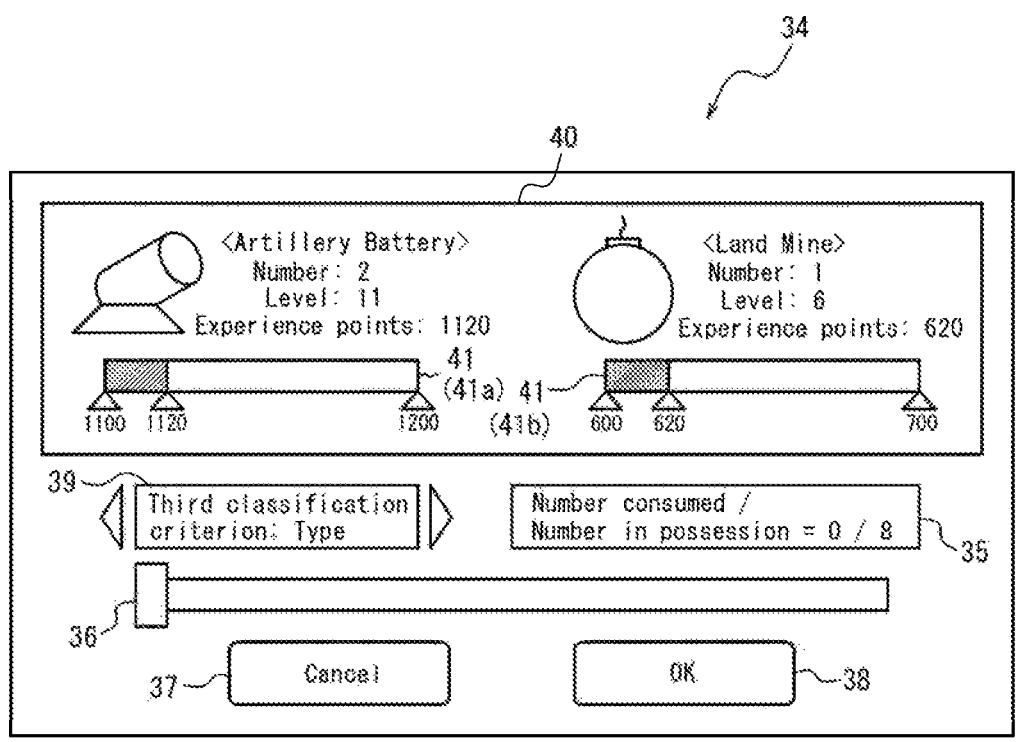
FIG. 13 illustrates an example of the third screen.

Next, for example in the state illustrated in FIG. 12, i.e. in which the first parameter is 2 points, upon detecting a third user operation on the OK button 38, the terminal controller 20 finalizes the experience points of the plurality of first game contents 31 and the second parameter of each of the plurality of second content groups at the time of the detection of the third user operation. Specifically, the terminal controller 20 first subtracts the number consumed (2 points), which is the first parameter at the time of the detection of the third user operation, from the number in possession (10 points), updates the number in possession to 8 points as illustrated in FIG. 13, and stores the result in the terminal memory 18. Next, the terminal controller 20 updates the experience points of each of the plurality of first game contents 31 and the second parameter of each of the plurality of second content groups respectively from the original values to the changed values (i.e. to the values at the time of the detection of the third user operation), and stores the results in the terminal memory 18. When the level of first game contents 31 changes in accordance with a change in the experience points, the terminal controller 20 updates the level of the first game contents 31 and another game parameter depending on the level (such as HP, attack strength, or defense strength) respectively from the original values to the changed values, and stores the results in the terminal memory 18. Preferably, the terminal controller 20 changes the displaying state of the image of the first game contents 31 whose level was updated. For example, the image of the first game contents 31 is switched to another image, or another image is superimposed on the image of the first game contents 31.

Figure 14:
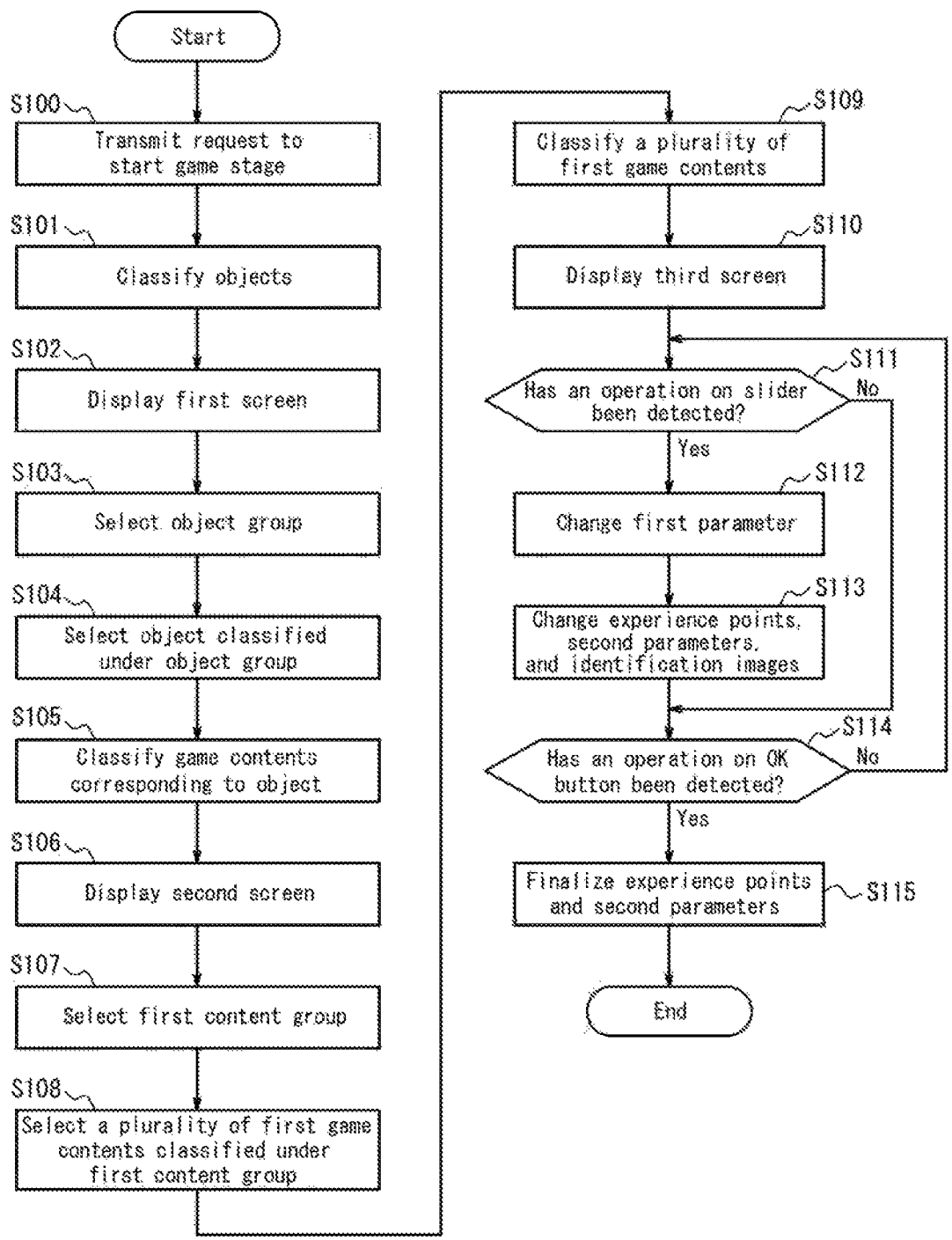
FIG. 14 is a flowchart illustrating operations of a terminal device.

Next, with reference to the flowchart in FIG. 14, operations of the terminal device 12 that executes the above-described third game stage are described.

Step S100: the terminal controller 20 first transmits a request to start the third game stage to the server 11.

Step S101: next, upon receipt of an instruction to start the third game stage from the server 11, which received the request to start the third game stage, the terminal controller 20 classifies objects 25 placed in the virtual space 24, i.e. objects 25 with which placing information is associated under a plurality of object groups in accordance with the selected first classification criterion.

Step S102: next, the terminal controller 20 displays a first screen 21 on the display 19.

Step S103: next, upon detecting a user operation on an object group button 27 on the first screen 21, the terminal controller 20 selects the object group corresponding to the object group button 27.

Step S104: next, the terminal controller 20 selects the object 25 classified under the selected object group.

Step S105: next, the terminal controller 20 classifies two or more first game contents 31 associated with the selected object 25 under a plurality of first content groups in accordance with the selected second classification criterion.

Step S106: next, the terminal controller 20 displays a second screen 28 on the display 19.

Step S107: next, upon detecting a user operation on a button 33 of first content group on the second screen 28, the terminal controller 20 selects the first content group corresponding to the button 33 of first content group.

Step S108: next, the terminal controller 20 selects a plurality of first game contents 31 classified under the selected first content group.

Step S109: next, the terminal controller 20 classifies the selected first game contents 31 under a plurality of second content groups in accordance with the selected third classification criterion.

Step S110: next, the terminal controller 20 displays a third screen 34 on the display 19. On the third screen 34 is displayed an identification image 41 that indicates the second parameter corresponding to each of the plurality of second content groups under which one or more first game contents 31 are classified in step S109.

Step S111: next, the terminal controller 20 determines whether a first user operation has been detected on the slider 36 on the third screen 34. When it is determined that a first user operation has been detected on the slider (step S111: Yes), processing proceeds to step S112. Conversely, when it is determined that a first user operation has not been detected (step S111: No), processing proceeds to step S114.

Step S112: when it is determined in step S111 that a first user operation has been detected (step S111: Yes), the terminal controller 20 changes the first parameter in accordance with the first user operation on the slider 36.

Step S113: next, the terminal controller 20 changes the following parameters in accordance with a change to the first parameter: the experience points of the plurality of first game contents 31 selected in step S108; the second parameters of the plurality of second content groups under which one or more first game contents 31 are classified in step S109; and a plurality of identification images 41 corresponding to the second parameters of the plurality of second content groups.

Step S114: after step S113, or when it is determined in step S111 that a first user operation has not been detected (step S111: No), the terminal controller 20 determines whether a third user operation has been detected on the OK button 38. When it is determined that a third user operation has been detected (step S114: Yes), processing proceeds to step S115. Conversely, when it is determined that a third user operation has not been detected (step S114: No), processing returns to step S111.

Step S115: when it is determined in step S114 that a third user operation has been detected (step S114: Yes), the terminal controller 20 finalizes the experience points of the plurality of first game contents 31 and the second parameters of the plurality of second content groups. Specifically, the terminal controller 20 updates the experience points of the plurality of first game contents 31 and the second parameters of the plurality of second content groups from the original values to the changed values, respectively, and stores the results in the terminal memory 18. The terminal controller 20 then ends the processing for the third game stage.

As described above, the terminal device according to this embodiment displays on the third screen 34 a plurality of identification images 41 based on information related to a plurality of first game contents 31, and changes each of the plurality of identification images 41 in accordance with a change to the first parameter. According to this configuration, information related to a plurality of first game contents 31 can be changed by a single first user operation to change one parameter (first parameter) alone, and the change in the information is visible by the user via a plurality of identification images 41. Therefore, for example as compared to a configuration in which a predetermined user operation is performed on each of the plurality of first game contents 31, the complexity of user operation can be eased and usability increases.

Each identification image 41 is an image of a second parameter based on information related to a first game content 31. The rate of change of the second parameter with respect to the first parameter is determined based on the information related to the first game content 31. This configuration offers a greater variety of changes in second parameter and further reduces the complexity of user operation to change a plurality of second parameters, for example as compared to a configuration in which a plurality of second parameters are changed uniformly.

Each time the first parameter changes, at least one of a plurality of second parameters changes in a predetermined order or with a predetermined frequency, or all of the plurality of second parameters change. This configuration offers a greater variety of changes in second parameter in accordance with a change to the first parameter.

Each identification image 41 is an indicator having a first reference value as the minimum value and a second reference value as the maximum value. When the second parameter changes to a value smaller than the first reference value, the terminal controller 20 sets a reference value that is equal to or smaller than the changed value of the second parameter as a new first reference value. According to this configuration, the minimum value of the indicator changes with the changed value of the second parameter. Accordingly, the identification image 41 increases in visibility Although this disclosure is based on drawings and examples, it is to be noted that various changes and modifications will be apparent to those skilled in the art based on this disclosure. Therefore, such changes and modifications are to be understood as included within the scope of this disclosure. For example, the functions and the like included in the various means and steps may be reordered in any logically consistent way. Furthermore, means or steps may be combined into one or divided.

For example, in the above-described embodiment, a configuration has been described in which the terminal controller 20 of the terminal device 12 classifies objects 25 in accordance with the first classification criterion, but this configuration may be omitted. In this case, for example upon detecting a user operation to select a predetermined number of objects 25 from among the objects 25 placed in the virtual space 24, the terminal controller 20 displays the second screen 28 to display first game contents 31 corresponding to the objects 25 on the second screen 28.

In the above-described embodiment, a configuration has been described in which first game contents 31 are associated with objects 25, but the configuration and processing related to objects 25 may be omitted. In this case, for example the terminal controller 20 displays a screen (fourth screen) that is similar to the second screen 28, for example without displaying the first screen 21 in the third game stage. In this case, the virtual space 24 and at least one of two or more first game contents 31 placed in the virtual space 24 are displayed in an area on the fourth screen corresponding to the display area 29 for objects in the second screen 28. The terminal controller 20 then executes similar processing, with the fourth screen displayed on the display, to that performed in the above-described embodiment with the second screen 28 displayed on the display. For example, upon detecting a user operation on a button 33 of first content group displayed on the fourth screen, the terminal controller 20 selects at least one first game content 31 that is classified under the first content group corresponding to the button 33 of first content group from among two or more first game contents 31 placed in the virtual space 24.

In the above-described embodiment, when the second parameter corresponding to the identification image 41 is equal to a predetermined maximum value, the terminal controller 20 may change the displaying state of the identification image 41 to another that is for example recognizable to the user (in which for example the identification image 41 is changed in color or brightness). In this embodiment, the predetermined maximum value is, as described above, the maximum value set for the experience points (for example, 10,000 points). Similarly, the terminal controller 20 changes, in the display area 40 for second content groups on the third screen 34, the displaying state of information related to a second content group whose second parameter reaches the maximum value (for example, an image of first game contents 31 classified under the second content group) to another that is for example recognizable to the user (in which for example the information is changed in color or brightness).

In the above-described embodiment, the terminal controller 20 may exclude, from the subject of processing to increase the experience points or the second parameter in accordance with the increase in the first parameter, any second content group whose second parameter is equal to the maximum value or any first game contents 31 classified under the second content group. The terminal controller 20 may also exclude, from the subject of processing to decrease the experience points or the second parameter in accordance with the decrease in the first parameter, any second content group whose second parameter is equal to the minimum value or any first game contents 31 classified under the second content group. According to this configuration, the experience points of a plurality of first game contents 31 can be changed more efficiently because only those first game contents 31 whose experience points can change in accordance with a change to the first parameter, or only those second content groups whose second parameter can change in accordance with a change to the first parameter are set as the subject of processing to change the experience points or the second parameter.

In the above-described embodiment, game parameters of a plurality of first game contents 31 have been described as being changed in accordance with a change to the first parameter, but a configuration may be adopted in which a variety of parameters related to game contents are changed. For example, the number of more than one type of game contents (for example, more than one type of characters or items) generated in accordance with a change to the first parameter may be changed. In this case, for example, the terminal controller 20 displays, for each type of generated game contents, the number of game contents generated in accordance with a change to the first parameter and an identification image 41 indicating the number.

In the above-described embodiment, a configuration has been described in which first game contents 31 are associated in advance with an object 25, but the first game contents 31 associated with an object 25 may be configured, for example, to be selected by a user or to be changeable to other game contents. A predetermined restriction may be placed on changing the first game contents 31 associated with an object 25. Specifically, one possible configuration is to allow a first game content 31 associated with an object 25 to be changed to another first game content 31 having the same attribute as the first game content 31 or to another game content 31 with an equal or lesser level. According to this configuration, a variety of first game contents 31 may be associated with an object 25, providing objects 25 with more variation and making the game more amusing. Furthermore, game balance can be maintained, since a predetermined restriction is placed on changing the first game contents 31.

In the above-described embodiment, a configuration may be adopted in which, for example, the first game stage and the third game stage are integrated. In this configuration, the terminal controller 20 executes for example the above-described processing for the first game stage and processing for the third game stage in parallel.

In the above-described embodiment, a configuration has been described in which each user possesses second game contents, and one of the user's second game contents is used in the second game stage, but the second game content used in the second game stage is not limited to this case. For example, instead of users individually possessing game contents, a configuration may be adopted in which all of the users use common game contents in the game. In this way, the users play the game under fair conditions, regardless of the type or effectiveness of possessed game contents, thereby increasing the degree to which the user's game playing techniques contribute to the decision as to whether or not the game task has been completed in the second game stage. Users are thus encouraged to improve their game playing techniques, and users become more interested in the game.

In the above-described embodiment, the terminal device 12 may be caused to display a portion of each type of game screen by web display based on data generated by the server 11, and a portion of the screens (for example, a header area and a footer area in which menu buttons are disposed) may be displayed by native display with a native application installed on the terminal device 12. This way, the game according to the above-described embodiment may be a hybrid game in which the server 11 and the terminal device 12 are each responsible for a portion of the processing.

An information processing system such as a computer, mobile phone, or the like may preferably be used to function as the server 11 or the terminal device 12 according to the above-described embodiment. A program with a description of the processing for achieving the functions of the server 11 or the terminal device 12 according to an embodiment is stored in the memory of the information processing system, and the functions are achieved by the CPU of the information processing system reading and executing the program.

The invention claimed is:

1. An information processing apparatus comprising:
circuitry configured to:
cause to be displayed an interface to vary a first parameter;
cause to be displayed a graphical indicator indicating at least one second parameter relating to at least one game content, wherein the graphical indicator includes a set first reference value smaller than the second parameter at a certain time;
vary the first parameter in response to a first operation by a user to the interface;
change the second parameter according to first variation of the first parameter; and
update the graphical indicator according to second variation of the second parameter, with the first reference value being changed in response to the changed second parameter being smaller than the first reference value, wherein after the updating, in response to a second operation by the user, a value of the second parameter at a time of the second operation is set for the second parameter, and upon updating the graphical indicator, the second parameter before and after the second variation is identifiably displayed.

2. The information processing apparatus according to claim 1, wherein in response to another instance of the first operation by the user, the first parameter is further varied, the second parameter is further changed, and the graphical indicator is further updated.

3. The information processing apparatus according to claim 1, wherein in the updating of the graphical indicator, the first reference value is changed to be smaller than before the updating.

4. The information processing apparatus according to claim 1, wherein a plurality of the second parameters are changed in response to a single instance of the first operation by the user.

5. The information processing apparatus according to claim 1, wherein upon updating the graphical indicator, an amount of the second variation of the second parameter is identifiably displayed.

6. An information processing apparatus comprising:
circuitry configured to:
cause to be displayed an interface to vary a first parameter;
cause to be displayed a graphical indicator indicating at least one second parameter relating to at least one game content, wherein the graphical indicator includes a set second reference value greater than the second parameter at a certain time;
vary the first parameter in response to a first operation by a user to the interface;
change the second parameter according to first variation of the first parameter; and
update the graphical indicator according to second variation of the second parameter, with the second reference value being changed in response to the changed second parameter being greater than the second reference value, wherein after the updating, in response to a second operation by the user, a value of the second parameter at a time of the second operation is set for the second parameter, and upon updating the graphical indicator, the second parameter before and after the second variation is identifiably displayed.

7. The information processing apparatus according to claim 6, wherein in response to another instance of the first operation by the user, the first parameter is further varied, the second parameter is further changed, and the graphical indicator is further updated.

8. The information processing apparatus according to claim 6, wherein in the updating of the graphical indicator, the second reference value is changed to be greater than before the updating.

9. The information processing apparatus according to claim 6, wherein a plurality of the second parameters are changed in response to a single instance of the first operation by the user.

10. The information processing apparatus according to claim 6, wherein upon updating the graphical indicator, an amount of the second variation of the second parameter is identifiably displayed.

11. An information processing apparatus comprising:
circuitry configured to:
cause to be displayed an interface to vary a first parameter;
cause to be displayed a graphical indicator indicating at least one second parameter relating to at least one game content, wherein the graphical indicator includes a set first reference value smaller than the second parameter at a certain time;
vary the first parameter in response to a first operation by a user to the interface;
change the second parameter according to first variation of the first parameter; and
update the graphical indicator according to second variation of the second parameter, with the first reference value being changed in response to the changed second parameter being smaller than the first reference value, wherein after the updating, in response to a second operation by the user, a value of the second parameter at a time of the second operation is set for the second parameter, and upon updating the graphical indicator, an amount of the second variation of the second parameter is identifiably displayed.

12. An information processing apparatus comprising:
circuitry configured to:
cause to be displayed an interface to vary a first parameter;
cause to be displayed a graphical indicator indicating at least one second parameter relating to at least one game content, wherein the graphical indicator includes a set second reference value greater than the second parameter at a certain time;
vary the first parameter in response to a first operation by a user to the interface;
change the second parameter according to first variation of the first parameter; and
update the graphical indicator according to second variation of the second parameter, with the second reference value being changed in response to the changed second parameter being greater than the second reference value, wherein after the updating, in response to a second operation by the user, a value of the second parameter at a time of the second operation is set for the second parameter, and upon updating the graphical indicator, an amount of the second variation of the second parameter is identifiably displayed.

13. A method comprising:
displaying an interface to vary a first parameter;
displaying a graphical indicator indicating at least one second parameter relating to at least one game content, wherein the graphical indicator includes a set first reference value smaller than the second parameter at a certain time;
varying the first parameter in response to a first operation by a user to the interface;
changing the second parameter according to first variation of the first parameter; and updating the graphical indicator according to second variation of the second parameter, with the first reference value being changed in response to the changed second parameter being smaller than the first reference value, wherein after the updating, in response to a second operation by the user, a value of the second parameter at a time of the second operation is set for the second parameter, and upon updating the graphical indicator, the second parameter before and after the second variation is identifiably displayed.

14. A non-transitory computer readable medium storing a program which causes an information processing apparatus for executing a game to execute a method comprising:

displaying an interface to vary a first parameter;

displaying a graphical indicator indicating at least one second parameter relating to at least one game content, wherein the graphical indicator includes a set first reference value smaller than the second parameter at a certain time;

varying the first parameter in response to a first operation by a user to the interface;

changing the second parameter according to first variation of the first parameter; and updating the graphical indicator according to second variation of the second parameter, with the first reference value being changed in response to the changed second parameter being smaller than the first reference value, wherein after the updating, in response to a second operation by the user, a value of the second parameter at a time of the second operation is set for the second parameter, and upon updating the graphical indicator, the second parameter before and after the second variation is identifiably displayed.

15. A method comprising:

displaying an interface to vary a first parameter;

displaying a graphical indicator indicating at least one second parameter relating to at least one game content, wherein the graphical indicator includes a set second reference value greater than the second parameter at a certain time;

varying the first parameter in response to a first operation by a user to the interface;

changing the second parameter according to first variation of the first parameter; and updating the graphical indicator according to second variation of the second parameter, with the second reference value being changed in response to the changed second parameter being greater than the second reference value, wherein after the updating, in response to a second operation by the user, a value of the second parameter at a time of the second operation is set for the second parameter, and upon updating the graphical indicator, the second parameter before and after the second variation is identifiably displayed.

16. A non-transitory computer readable medium storing a program which causes an information processing apparatus for executing a game to execute a method comprising:

displaying an interface to vary a first parameter;

displaying a graphical indicator indicating at least one second parameter relating to at least one game content, wherein the graphical indicator includes a set second reference value greater than the second parameter at a certain time;

varying the first parameter in response to a first operation by a user to the interface;

changing the second parameter according to first variation of the first parameter; and updating the graphical indicator according to second variation of the second parameter, with the second reference value being changed in response to the changed second parameter being greater than the second reference value, wherein after the updating, in response to a second operation by the user, a value of the second parameter at a time of the second operation is set for the second parameter, and upon updating the graphical indicator, the second parameter before and after the second variation is identifiably displayed.

* * * * *